(12) United States Patent
Kim et al.

(10) Patent No.: US 12,735,574 B2
(45) Date of Patent: Sep. 15, 2026

(54) COMPOUND, ANTI-REFLECTIVE FILM COMPRISING SAME, AND DISPLAY DEVICE

(71) Applicant: SAMSUNG SDI CO., LTD., Yongin-si (KR)

(72) Inventors: Kyuyoung Kim, Suwon-si (KR); Sunwoong Shin, Suwon-si (KR); Eunjeong Choi, Suwon-si (KR); Eun Sun Yu, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 725 days.

(21) Appl. No.: 17/914,854

(22) PCT Filed: Mar. 11, 2021

(86) PCT No.: PCT/KR2021/003024
§ 371 (c)(1),
(2) Date: Sep. 27, 2022

(87) PCT Pub. No.: WO2021/215659
PCT Pub. Date: Oct. 28, 2021

(65) Prior Publication Data

US 2023/0123971 A1 Apr. 20, 2023

(30) Foreign Application Priority Data

Apr. 24, 2020 (KR) ........................ 10-2020-0050228

(51) Int. Cl.
*C09B 47/20* (2006.01)
*C07F 1/08* (2006.01)
*C09J 7/29* (2018.01)
*G02B 1/111* (2015.01)

(52) U.S. Cl.
CPC ................ *C09B 47/20* (2013.01); *C07F 1/08* (2013.01); *C09J 7/29* (2018.01); *G02B 1/111* (2013.01)

(58) Field of Classification Search
CPC .... C09B 47/20; C09J 7/29; C07F 1/08; G02B 1/111
See application file for complete search history.

(56) References Cited

U.S. PATENT DOCUMENTS 4,830,469 A 5/1989 Breddels et al.
6,844,903 B2 1/2005 Mueller-Mach et al.
2014/0264202 A1 9/2014 Nagaya et al.

FOREIGN PATENT DOCUMENTS

JP S62-149494 A 7/1987
JP 2001-131453 A 5/2001
JP 2006-342264 A 12/2006
JP 4002516 B2 11/2007

(Continued)

OTHER PUBLICATIONS

Hazim K Yahya and Salwa Y Kazandji, Synthesis of some cobalt phthalocyanine-3,3',3" ,3'"-tetrasulphonamides and spectroscopic studies of their application to cellulosic fibres, 432 JSDC vol. 104 Nov. 1988.*

(Continued)

*Primary Examiner* — Bijan Ahvazi
(74) *Attorney, Agent, or Firm* — Lee IP Law, P.C.

(57) ABSTRACT

Provided are a compound expressed by a particular chemical formula, an anti-reflective film, and a display device including the anti-reflective film.

17 Claims, 5 Drawing Sheets

(56) References Cited

FOREIGN PATENT DOCUMENTS

| | | | | | |
|---|---|---|---|---|---|
| JP | 2008241882 A | * | 10/2008 | .............. | C09D 4/00 |
| JP | 2011-093958 A | | 5/2011 | | |
| JP | 2016-066020 A | | 4/2016 | | |
| JP | 2016-110979 A | | 6/2016 | | |
| JP | 6331392 B2 | | 5/2018 | | |
| KR | 10-2010-0020347 A | | 2/2010 | | |
| KR | 20100020347 A | * | 2/2010 | ................ | C07F 1/08 |
| KR | 10-2019-0109988 A | | 9/2019 | | |
| KR | 20190109988 A | * | 9/2019 | .............. | C09J 11/08 |

OTHER PUBLICATIONS

Stingaciu, Elena; Minca, Corneliu; Sebe, lon, Phthalocyanine sulfonamide pigments and dyes., Revista de Chimie (Bucharest, Romania), 58(7), 650-654 (Year: 2007).*

McKeown, N. B., Product class 9: phthalocyanines and related compounds, Science of Synthesis (2004), 17, 1237-1368 (Year: 2004).*

Hazim K. Yahyaand A. A. Dawoodt, Synthesis of Some Metal Phthalocyaninetetrakis(N-cyclopropylsulfonamides, J. Chem. Eng. Data 1988, 33, 530-531. (Year: 1988).*

Chemical Abstract Compound, STNext RN 81893-93-8.

Chemical Abstract Compound, STNext RN 119861-61-9.

Hazim, K, Y, Et al., “Synthesis of some cobalt phthalocyanine-3,3',3'', 3'''-tetrasulphonamides and spectroscopic studies of their application to cellulosic fibres”, JSDC, 1988, vol. 104, p. 432-434.

Vlaskin, V, I et al., “Association of some phthalocyanines: from solutions to thin films”, Thin Solid Films, 1996, 286, p. 40-44.

Solov Eva, L.I., et al., Phthalocyanine and related compounds XX. Alkyl amides of isomeric phthalocyaninetetra-and-octasulfonic acids, Zhu rnal Obshchei Khimii 1982, vol. 52, No. 1, pp. 90-101.

Yahya, Hazim K., et al., Synthesis of some cobalt phthalocyanine-3,3',3'',3'''-tetrasulfonamides and spectroscopic studies of their application to cellulosic fibers, Journal of the Society of Dyers and Colourists, 1988, vol. 104, No. 11, pp. 432-434.

Hazim K Yahya and Salwa Y Kazandji, J.Soc.DyersColour., 104, 432 (1988).

* cited by examiner

COMPOUND, ANTI-REFLECTIVE FILM COMPRISING SAME, AND DISPLAY DEVICE

CROSS REFERENCE TO RELATED APPLICATIONS

This is the U.S. national phase application based on PCT Application No. PCT/KR2021/003024, filed Mar. 11, 2021, which is based on Korean Patent Application No. 10-2020-0050228, filed Apr. 24, 2020, the entire contents of all of which are hereby incorporated by reference.

TECHNICAL FIELD

This disclosure relates to a compound, an anti-reflective film including the same, and a display device including the anti-reflective film.

BACKGROUND ART

In a typical liquid crystal display (LCD), light emitted from a white light source passes through an RGB color filter of each pixel to form a sub-pixel of each color, and a color in the RGB range may be produced by combining these.

In recent years, new displays using light emitting bodies such as quantum dots and organic-inorganic phosphors that emit the color of each sub-pixel are being developed and a method of using a UV light source and a method of using a blue light source have been proposed as methods of excitation of these blue, green, and red light sources.

When a UV light source is used, each color is generated and implemented with blue, green, and red light emitting bodies, but when a blue light source is used, green and red are each color generated by light emitting bodies, and blue pixels transmit the light source as it is.

In the case of a display material including quantum dots recently commercialized or under development, light emission of green quantum dots and red quantum dots through a blue light source or a white light source is used. Quantum dot-containing display devices are intended to improve color gamut and luminance by using a quantum dot material, and development of a panel using quantum dot light emission using various types of light sources has been continuously made. In addition, it is possible to improve a viewing angle according to the location of the quantum dot material in a panel configuration. Next-generation quantum dot display devices are being developed in terms of increasing an intensity of a light source or in terms of developing a light source with an extended blue area in order to improve luminous efficiency of the quantum dots.

In a quantum dot display device, a spectrum of the light source reaching the quantum dot material has a very close effect on the efficiency of the quantum dot. Since characteristics of each light source are different depending on the type of light source, efforts in various fields are being continued to introduce a new approach in order to improve efficiency of each light source.

On the other hand, in the case of a new display using a light emitting body, it is necessary to lower a reflectance by external light or adjust a panel color caused by scattered reflection. In order to solve this problem, there has been an attempt to use a dye in the optical member constituting the panel. When a quantum dot is used as the light emitting body, it is difficult to decrease the reflectance by external light or to adjust the panel color.

Accordingly, in the case of new displays, anti-reflective films with improvement of luminance loss or color correction are being introduced, and recently, there are attempts to additionally apply cyanine-based dyes or azo-based dyes as dyes capable of absorbing light of a specific wavelength to maximize the low-reflection characteristics of the anti-reflective film.

However, the cyanine-based dye or azo-based dye is capable of absorbing light in a short wavelength region, but has a problem of lowering light resistance reliability, and thus it is difficult to apply it to an anti-reflective film.

DISCLOSURE

Technical Problem

An object of the present invention is to provide a compound capable of absorbing light in a red wavelength region of a light source.

Another embodiment provides an anti-reflective film including the compound.

Another embodiment provides a display device including the anti-reflective film.

Another object of the present invention is to provide an optical member having a high color correction effect and remarkably lowering reflectance to improve reflected color and to have high total light transmittance.

Technical Solution

An embodiment provides a compound represented by Chemical Formula 1.

[Chemical Formula 1]

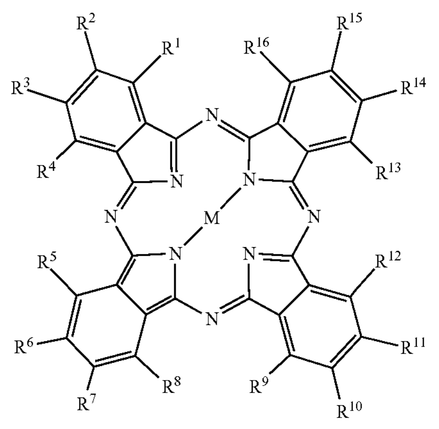

In Chemical Formula 1,

M is two hydrogen atoms, a divalent metal atom, a trivalent substituted metal atom, a tetravalent substituted metal atom, a metal hydroxide atom, or a metal oxide atom, $R^1$ to $R^{16}$ are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C2 to C20 heteroaryl group, a sulfonylamide group represented by Chemical Formula 2, or a combination thereof, and at least one of $R^1$ to $R^8$ and at least one of $R^9$ to $R^{16}$ is a sulfonylamide group represented by Chemical Formula 2.

[Chemical Formula 2]

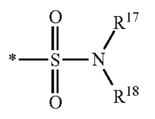

In Chemical Formula 2, $R^{17}$ and $R^{18}$ are each independently hydrogen, a substituted or unsubstituted C1 to C20 alkyl group, a substituted or unsubstituted C3 to C20 cycloalkyl group, a substituted or unsubstituted C6 to C20 aryl group, or a substituted or unsubstituted C2 to C20 heteroaryl group, at least one of $R^{17}$ and $R^{18}$ is a C3 to C20 cycloalkyl group, and

* indicates a moiety bonded to the benzene ring of Chemical Formula 1.

$R^{17}$ and $R^{18}$ may each independently be hydrogen or a substituted or unsubstituted C3 to C20 cycloalkyl group, and at least one of $R^{17}$ and $R^{18}$ may be a C3 to C20 cycloalkyl group.

M may be Cu, Co, Zn, V(═O), or Ag.

At least one of $R^1$ to $R^4$ may be the sulfonylamide group represented by Chemical Formula 2, at least one of $R^5$ to $R^8$ may be the sulfonylamide group represented by Chemical Formula 2, at least one of $R^9$ to $R^{12}$ may be the sulfonylamide group represented by Chemical Formula 2, and at least one of $R^{13}$ to $R^{16}$ may be the sulfonylamide group represented by Chemical Formula 2.

At least one of $R^1$ to $R^4$ may be the sulfonylamide group represented by Formula 2 and the remainder may be a hydrogen atom; at least one of $R^5$ to $R^8$ may be the sulfonylamide group represented by Chemical Formula 2 and the remainder may be a hydrogen atom; at least one of $R^9$ to $R^{12}$ may be the sulfonylamide group represented by Chemical Formula 2 and the remainder may be a hydrogen atom; and at least one of $R^{13}$ to $R^{16}$ may be the sulfonylamide group represented by Chemical Formula 2 and the remainder may be a hydrogen atom.

The compound may be a compound represented by Chemical Formula 3.

[Chemical Formula 3]

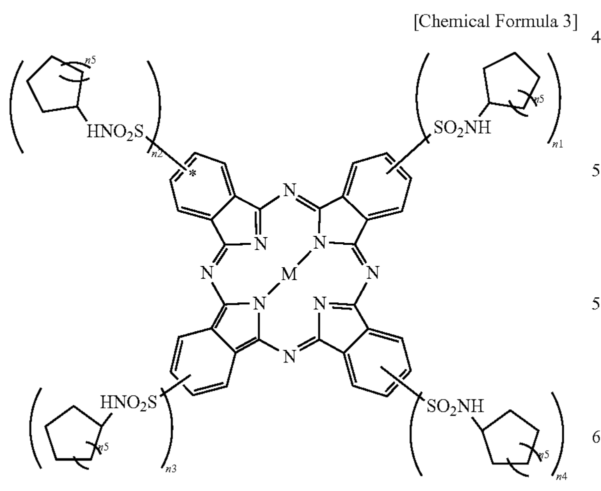

In Chemical Formula 3,

M is Cu, Co, Zn, V(═O), or Ag, $n_1$ to $n_4$ are each independently an integer of 0 or 1, and $n_5$ is an integer of 1 to 4, provided that $n_1+n_2+n_3+n_4 \neq 0$.

The compound may include a compound represented by any one Chemical Formula 4 to Chemical Formula 14.

[Chemical Formula 4]

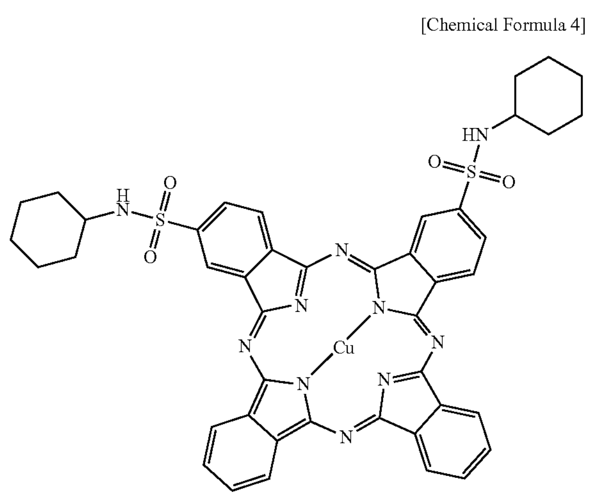

[Chemical Formula 5]

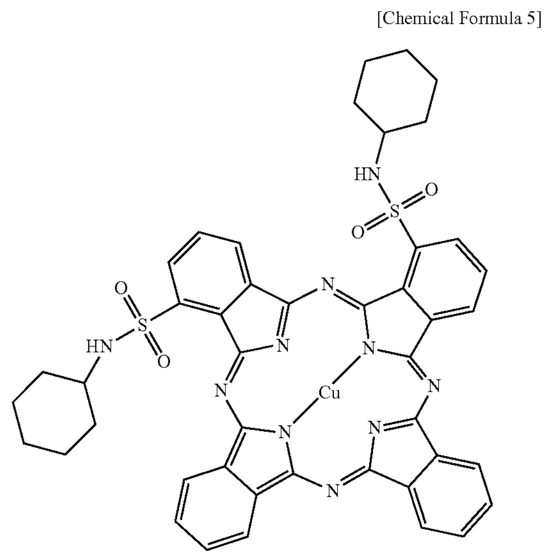

[Chemical Formula 6]

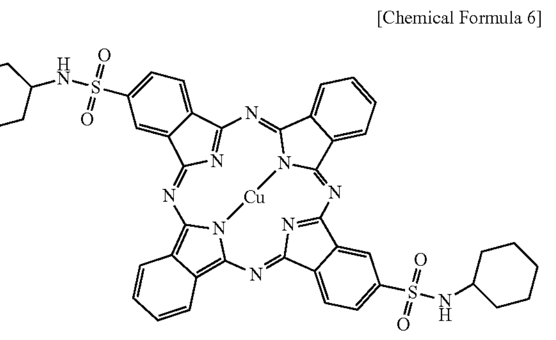

-continued
[Chemical Formula 7]
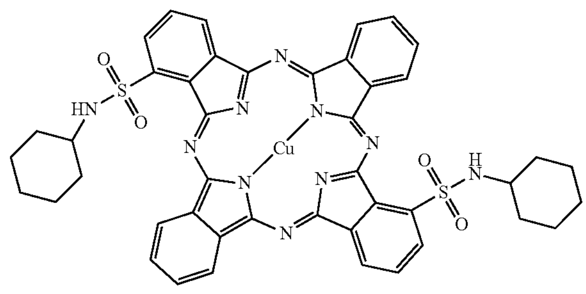
[Chemical Formula 8]
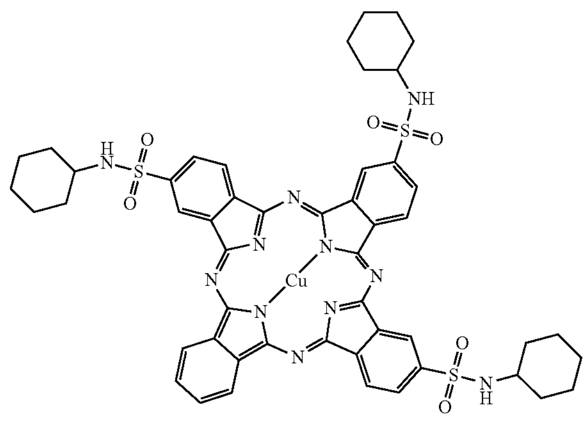
[Chemical Formula 9]
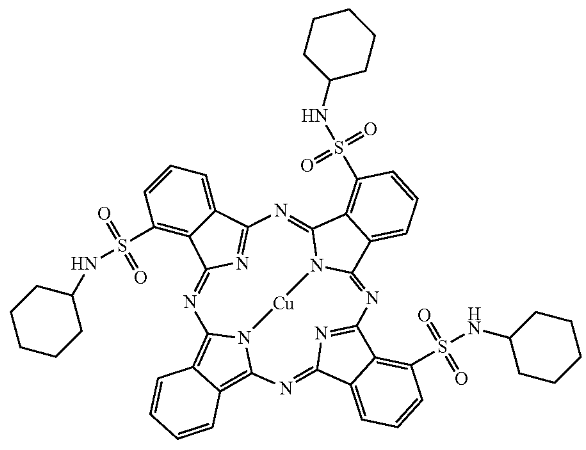
-continued
[Chemical Formula 10]
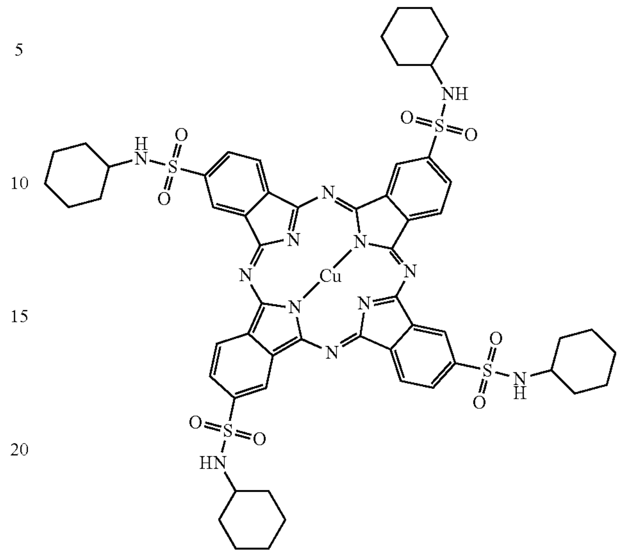
[Chemical Formula 11]
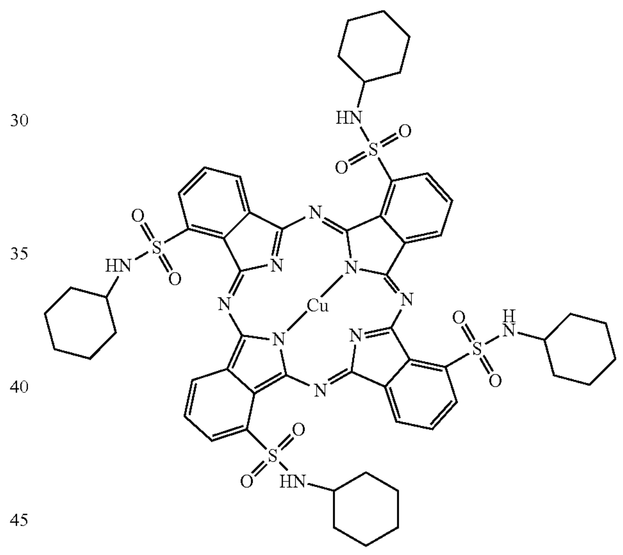
[Chemical Formula 12}
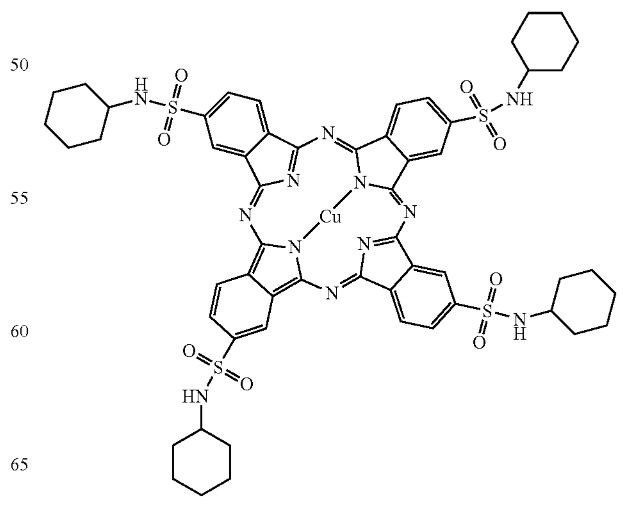

-continued

[Chemical Formula 13]

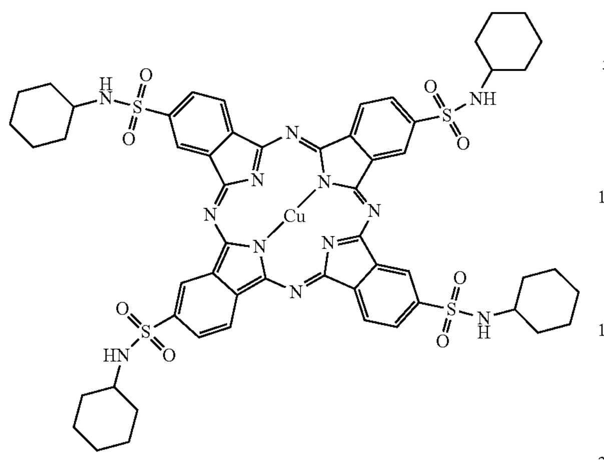

[Chemical Formula 14]

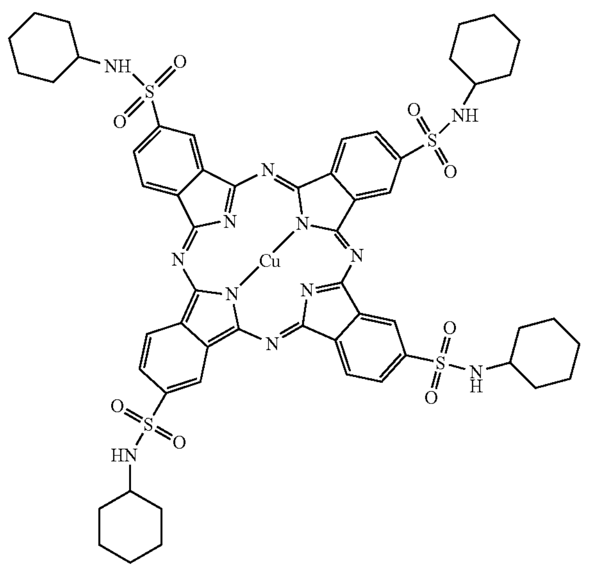

The compound may be a red absorbing dye.

The dye may have a maximum absorption peak at a wavelength of 650 nm to 750 nm.

Another embodiment provides an anti-reflective film including the compound.

The anti-reflective film may include an adhesive layer and an anti-reflective layer on the adhesive layer, and the compound may be included in the adhesive layer.

The anti-reflective film may include an adhesive layer, a dye-containing layer, and an anti-reflective layer on the dye-containing layer, and the compound may be included in the dye-containing layer.

Another embodiment provides a display device including the anti-reflective film.

The display device may further include a quantum dot-containing layer.

The display device may further include a quantum dot-containing layer, a light source, a color filter, and a substrate.

In the display device, the quantum dot-containing layer may be disposed on the light source, the color filter may be disposed on the quantum dot-containing layer, the substrate may be disposed on the color filter, and the anti-reflective film may be disposed on the substrate.

The substrate may include a glass substrate.

Other embodiments of the present invention are included in the following detailed description.

Advantageous Effects

The compound according to an embodiment is included in the anti-reflective film to absorb the light source in a near-infrared (650 nm to 750 nm) region, so that even a very small amount may block the near-infrared region to lower a reflectance of the display device due to external light and to improve light resistance reliability as well as to improve luminance loss and a color gamut.

MODE FOR INVENTION

Figure 1:
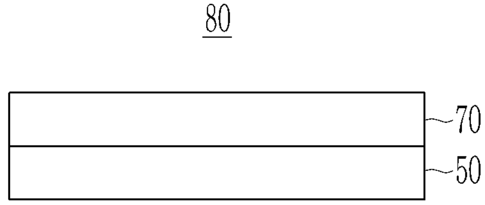
FIGS. 1 and 2 are schematic views each independently illustrating an anti-reflective film according to an embodiment.

Hereinafter, embodiments of the present invention are described in detail. However, these embodiments are exemplary, the present invention is not limited thereto and the present invention is defined by the scope of claims.

In the present specification, when specific definition is not otherwise provided, "substituted" refers to replacement of at least one hydrogen of a compound by a substituent selected from a halogen atom (F, Cl, Br, or I), a hydroxy group, a C1 to C20 alkoxy group, a nitro group, a cyano group, amine group, imino group, an azido group, an amidino group, a hydrazino group, a hydrazono group, a carbonyl group, a carbamyl group, a thiol group, an ester group, ether group, a carboxyl group or a salt thereof, sulfonic acid group or a salt thereof, phosphoric acid or a salt thereof, C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, or a combination thereof.

In the present specification, when specific definition is not otherwise provided, "heterocycloalkyl group," "heterocycloalkenyl group," "heterocycloalkynyl group," and "heterocycloalkylene group" refer to cycloalkyl, cycloalkenyl, cycloalkynyl and cycloalkyl including at least one heteroatom of N, O, S, or P in the ring compound, respectively.

In the present specification, when specific definition is not otherwise provided, the term "combination" refers to mixing or copolymerization.

In the present specification, when a definition is not otherwise provided, hydrogen is bonded at the position when a chemical bond in chemical formulae is not drawn where supposed to be given.

In the present specification, when specific definition is not otherwise provided, "(meth)acrylate" refers to both "acrylate" and "methacrylate," and "(meth)acrylic acid" refers to "acrylic acid" and "methacrylic acid."

In the present specification, when specific definition is not otherwise provided, "alkyl group" refers to a C1 to C20 alkyl group, and specifically a C1 to C15 alkyl group, "cycloalkyl group" refers to a C3 to C20 cycloalkyl group, and specifically a C3 to C18 cycloalkyl group, "alkoxy group" refers to a C1 to C20 alkoxy group, and specifically a C1 to C18 alkoxy group, "aryl group" refers to a C6 to C20 aryl group, and specifically a C6 to C18 aryl group, "alkenyl group" refers to a C2 to C20 alkenyl group, and specifically a C2 to C18 alkenyl group, "alkylene group" refers to a C1 to C20 alkylene group, and specifically a C1 to C18 alkylene group, and "arylene group" refers to a C6 to C20 arylene group, and specifically a C6 to C16 arylene group.

In the present specification, when a definition is not otherwise provided, "*" refers to a linking part between the same or different atoms, or Chemical Formulae.

In the present specification, a "maximum absorption wavelength ($\lambda_{max}$)" of a compound (dye) refers to a wavelength at which the maximum absorbance appears when absorbance is measured for a solution of a compound (dye) at a concentration of 10 ppm in cyclohexanone. The maximum absorbance may be measured according to a method known to those skilled in the art.

In the present specification, "light resistance reliability" is evaluated by a change of light transmittance. The light transmittance of a display device is measured at a maximum absorption wavelength of a dye before and after irradiation under the conditions of in the Xenon Test Chamber (Q-SUN) [light source lamp: Xenon lamp, irradiation intensity: 0.35 W/cm$^2$, irradiation temperature: 63° C., irradiation time: 500 hours, and irradiation direction: irradiation from the anti-reflective film side].

An embodiment provides a compound represented by Chemical Formula 1.

[Chemical Formula 1]

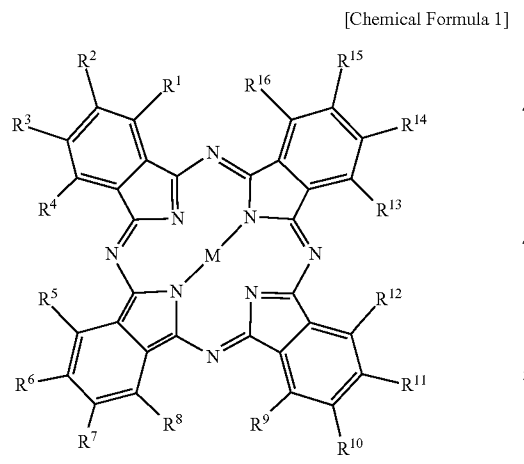

In Chemical Formula 1,

M is Zn, Co, or Cu, $R^1$ to $R^{16}$ are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C2 to C20 heteroaryl group, a sulfonylamide group represented by Chemical Formula 2, or a combination thereof, and at least one of $R^1$ to $R^8$ and at least one of $R^9$ to $R^{16}$ is a sulfonylamide group represented by Chemical Formula 2,

[Chemical Formula 2]

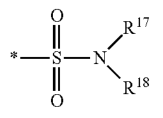

wherein, in Chemical Formula 2, $R^{17}$ and $R^{18}$ are each independently hydrogen, a substituted or unsubstituted C1 to C20 alkyl group, a substituted or unsubstituted C3 to C20 cycloalkyl group, a substituted or unsubstituted C6 to C20 aryl group, or a substituted or unsubstituted C2 to C20 heteroaryl group, wherein at least one of $R^{17}$ and $R^{18}$ is a C3 to C20 cycloalkyl group, and * indicates a moiety bonded to the benzene ring of Chemical Formula 1.

When a near-infrared blocking dye (general Zn-PC dye) conventionally used in a plasma display is applied to an anti-reflective film, an amount of the dye is increased to achieve a color correction function, but the anti-reflective film using the same has a problem that transmittance of the film is increased due to discoloration of the dye in the evaluation of light resistance reliability.

The present invention is to apply Cu-PC (phthalocyanine) having a specific substituent structure to an anti-reflective film to strongly absorb light in a near-infrared region and simultaneously, to reduce an amount of the dye due to improved wavelength matching and resultantly, accomplish a predetermined level of reflectance and excellent light resistance reliability due to structural characteristics of the dye.

When the compound represented by Chemical Formula 1 is used as a dye, the compound may strongly absorb light in the near-infrared, that is, in a wavelength range of 650 nm to 750 nm and thus increase color reproducibility of the red region and improve luminance loss of a panel, compared with a method of using the near-infrared ray-blocking dye (general Zn-PC dye). When the compound represented by Chemical Formula 1 according to an embodiment is applied to an anti-reflective film, light resistance reliability may be secured.

Specifically, when the compound represented by Chemical Formula 1 is used as a dye, luminance of the blue region (450 nm to 485 nm) and the red region (625 nm to 740 nm) may be improved.

Since the compound according to an embodiment includes a substituent represented by Chemical Formula 2, even with a small amount thereof may express a clearer color, improving luminance of a display and obtaining a display device with excellent color characteristics.

In order to achieve a similar purpose, attempts to absorb light in a wavelength region of 750 nm to 850 nm by using the conventional dye have been made, wherein since the conventional dye is used in a relatively larger amount, there is a problem of securing no process margin of the entire composition.

However, when the compound according to an embodiment is used as a dye, sufficient high color reproduction may be achieved with only a small amount of the compound, which solves the problem.

$R^{17}$ and $R^{18}$ may each independently be hydrogen, a substituted or unsubstituted C1 to C10 alkyl group, a substituted or unsubstituted C3 to C6 cycloalkyl group, a substituted or unsubstituted C6 to C14 aryl group, or a substituted or unsubstituted C2 to C14 heteroaryl group heteroaryl group, wherein at least one of $R^{17}$ and $R^{18}$ may be a C3 to C10 cycloalkyl group.

$R^{17}$ and $R^{18}$ may each independently be hydrogen, a substituted or unsubstituted C1 to C6 alkyl group, a substituted or unsubstituted C3 to C6 cycloalkyl group, a substituted or unsubstituted C6 to C10 aryl group, or a substituted or unsubstituted C2 to C10 heteroaryl group heteroaryl group, wherein at least one of $R^{17}$ and $R^{18}$ may be a C3 to C6 cycloalkyl group.

$R^{17}$ and $R^{18}$ may each independently be hydrogen or a substituted or unsubstituted C3 to C20 cycloalkyl group wherein at least one of $R^{17}$ and $R^{18}$ may be a C3 to C20 cycloalkyl group.

$R^{17}$ and $R^{18}$ may each independently be hydrogen or a substituted or unsubstituted C3 to C10 cycloalkyl group wherein at least one of $R^{17}$ and $R^{18}$ may be a C3 to C10 cycloalkyl group.

$R^{17}$ and $R^{18}$ may each independently be hydrogen or a substituted or unsubstituted C3 to C6 cycloalkyl group wherein at least one of $R^{17}$ and $R^{18}$ may be a C3 to C6 cycloalkyl group.

At least one of $R^1$ to $R^4$ may be the sulfonylamide group represented by Chemical Formula 2, at least one of $R^5$ to $R^8$ may be the sulfonylamide group represented by Chemical Formula 2, at least one of $R^9$ to $R^{12}$ may be the sulfonylamide group represented by Chemical Formula 2, and at least one of $R^{13}$ to $R^{16}$ may be the sulfonylamide group represented by Chemical Formula 2.

At least one of $R^1$ to $R^4$ may be the sulfonylamide group represented by Formula 2 and the remainder may be a hydrogen atom; at least one of $R^5$ to $R^8$ may be the sulfonylamide group represented by Chemical Formula 2 and the remainder may be a hydrogen atom; at least one of $R^9$ to $R^{12}$ may be the sulfonylamide group represented by Chemical Formula 2 and the remainder may be a hydrogen atom; and at least one of $R^{13}$ to $R^{16}$ may be the sulfonylamide group represented by Chemical Formula 2 and the remainder may be a hydrogen atom.

The compound may be a compound represented by Chemical Formula 3.

[Chemical Formula 3]

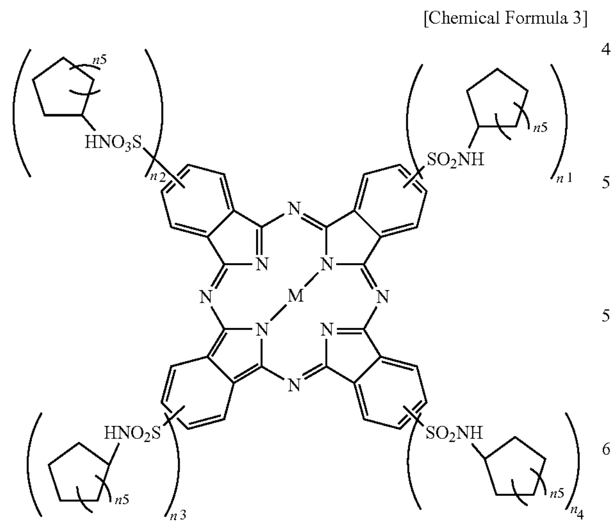

In Chemical Formula 3,

M is Cu, Co, Zn, V(=O), or Ag, $n_1$ to $n_4$ are each independently an integer of 0 or 1, and $n_5$ is an integer of 1 to 4, provided that $n_1+n_2+n_3+n_4 \neq 0$.

Like a structure of the compound represented by Chemical Formula 3, the sulfonylamide group substituted for the benzene ring may be substituted at a position of two α (adjacent) and β (second) carbons, wherein one compound may be substituted with 1 to 4 sulfonylamide groups, and most preferably, 3 or 4 sulfonylamide groups, obtaining the most excellent light absorption in a red wavelength region.

For example, when the compound represented by Chemical Formula 3 may be substituted with the four sulfonylamide groups, since the sulfonylamide group may be substituted on the α (adjacent) or β (second) carbon of the benzene ring, a mixture of more than five structural isomers may be produced, and the present invention may all include the structural isomer mixtures.

For example, the compound represented by Chemical Formula 1 may be a compound represented by any one Chemical Formula 4 to Chemical Formula 14, but is not necessarily limited thereto.

[Chemical Formula 4]

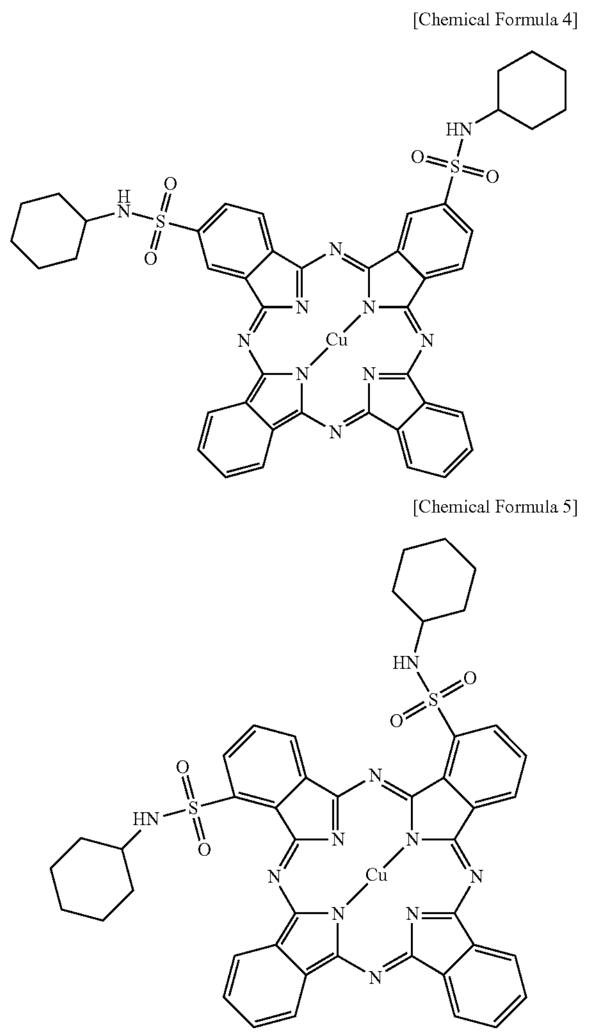

[Chemical Formula 5]

-continued
[Chemical Formula 6]
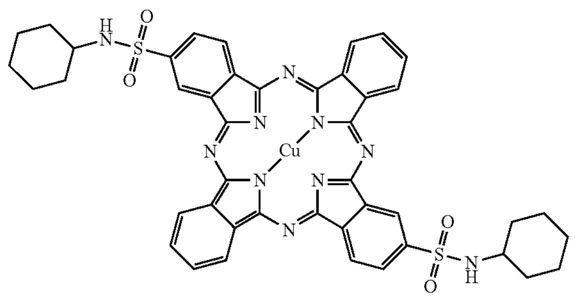
[Chemical Formula 7]
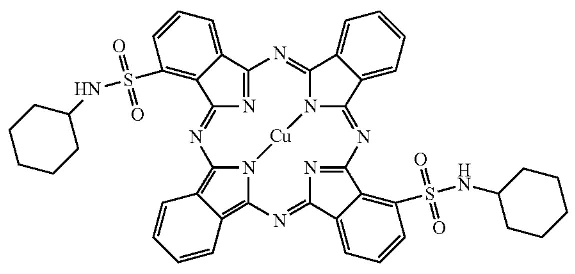
[Chemical Formula 8]
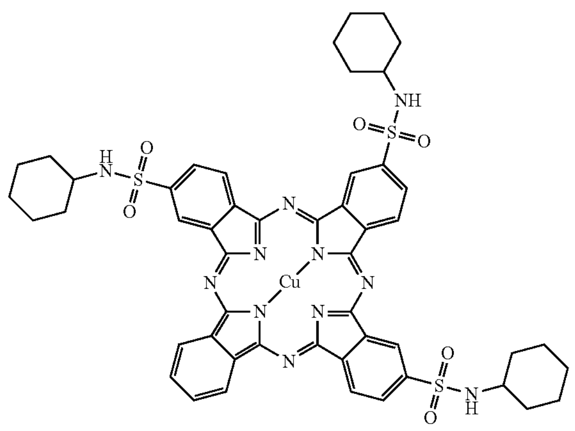
[Chemical Formula 9]
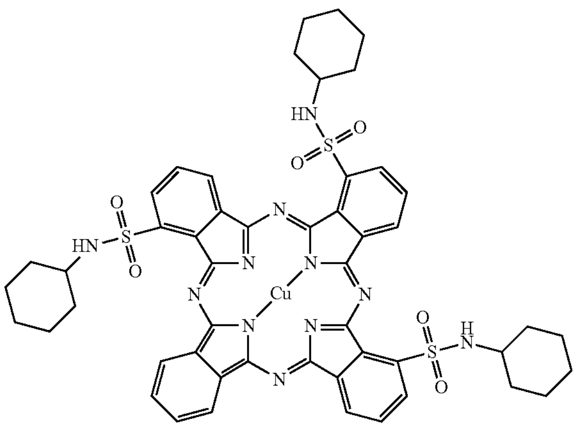
-continued
[Chemical Formula 10]
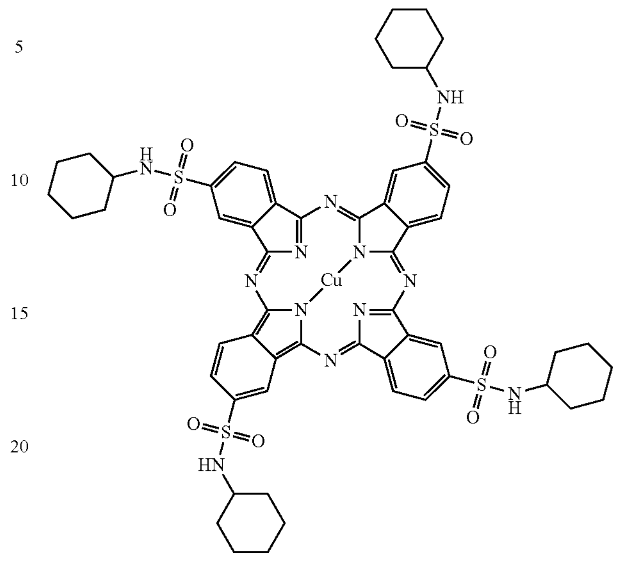
[Chemical Formula 11]
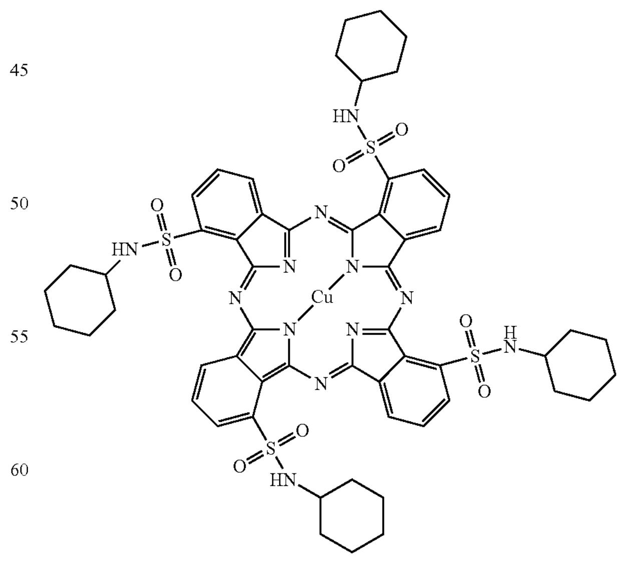

-continued

[Chemical Formula 12]

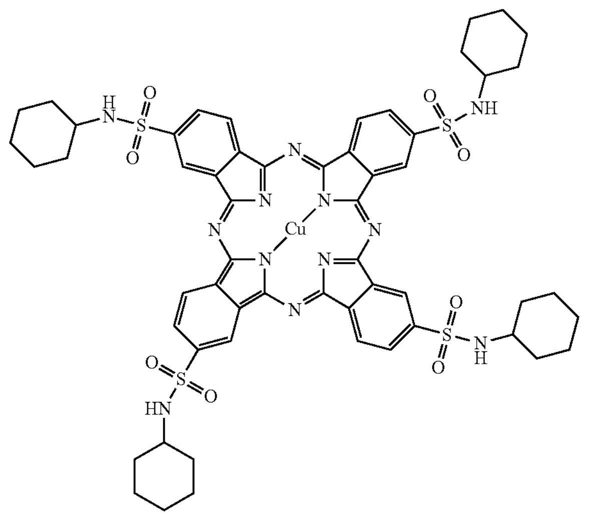

[Chemical Formula 13]

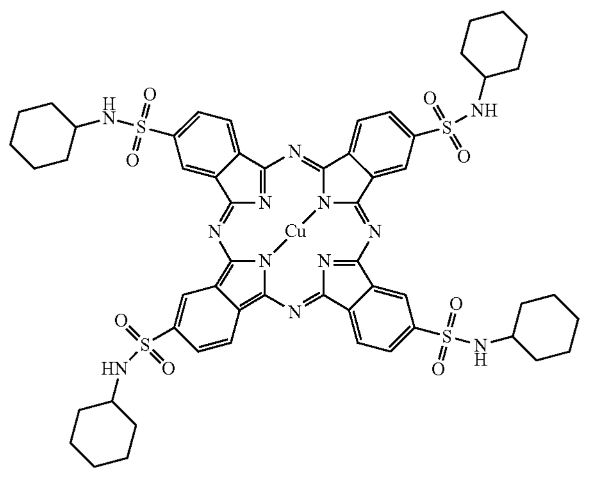

[Chemical Formula 14]

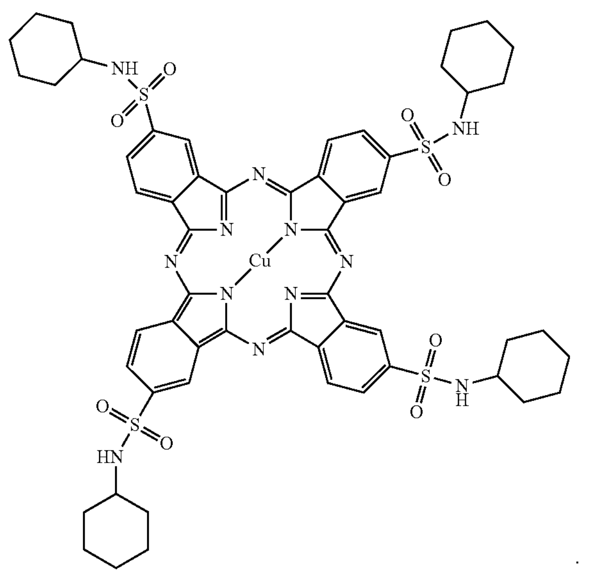

In the present invention, two or more compounds of the compounds represented by Chemical Formula 4 to Chemical Formula 14 may be simultaneously included as a mixture.

The compound may be a red absorbing dye.

The dye may have a maximum absorption peak at a wavelength of 650 nm to 750 nm, and specifically a maximum absorption peak at a wavelength of 650 nm to 700 nm. That is, when the compound is used as a dye included in the anti-reflective film, light in the near-infrared region may be maximally absorbed to block the spectroscopy of the region.

According to another embodiment, an adhesive composition including the compound according to the embodiment is provided.

The adhesive composition may include the compound represented by Chemical Formula 1 in an amount of 0.0001 wt % to 1 wt %, for example, 0.001 wt % to 1 wt %, for example, 0.01 wt % to 1 wt %, for example, 0.1 wt % to 1 wt %, for example, 0.0001 wt % to 0.5 wt %, for example, 0.001 wt % to 0.5 wt %, for example, 0.01 wt % to 0.5 wt %, for example, 0.1 wt % to 0.5 wt % based on the total amount of the adhesive composition. When the compound represented by Chemical Formula 1 is included in the above content range, it is effective to improve light resistance reliability by adjusting the panel color of the display device to which the anti-reflective film is applied.

Another embodiment provides an anti-reflective film including the compound.

The anti-reflective film includes an adhesive layer and an anti-reflective layer formed on the adhesive layer, and the compound represented by Chemical Formula 1 may be included in the adhesive layer.

In addition, the anti-reflective film includes an adhesive layer, a dye-containing layer, and an anti-reflective layer formed on the dye-containing layer, and the compound represented by Chemical Formula 1 may be included in the dye-containing layer.

Figure 2:
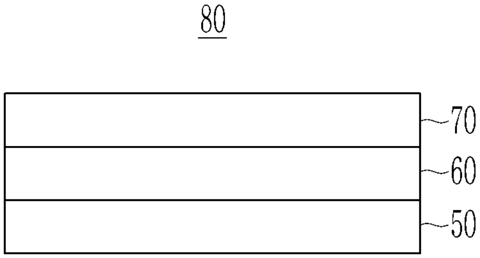

That is, in the stacked structure of the anti-reflective film according to an embodiment, the compound represented by Chemical Formula 1 may be included in the adhesive layer or may be included in a separate dye-containing layer. (See FIGS. 1 and 2)

The anti-reflective layer may consist of only a low refractive layer or may include a low refractive layer.

The low refractive layer may lower a reflectance of the anti-reflective film due to a difference in refractive index between the substrate and/or the high refractive layer described later.

The low refractive layer may include a curable binder resin, a fluorine atom-containing monomer, and fine particles (e.g., hollow silica) having an average particle diameter of 5 nm to 300 nm, and the thickness of the low refractive layer may be 0.01 μm to 0.15 μm. The refractive index of the low refractive layer may be 1.20 to 1.40.

An additional function may be imparted to the anti-reflective film by further forming a functional coating layer on one surface of the low refractive layer, that is, on the upper surface of the low refractive layer. The functional coating layer may include an anti-fingerprint layer, an anti-static layer, a hard coating layer, an antiglare layer, a barrier layer, etc., but is not limited thereto.

The anti-reflective layer may further include a high refractive layer.

The high refractive layer is formed between the substrate to be described later and the low refractive layer, and has a refractive index between the substrate and the low refractive layer, thereby reducing the reflectance of the anti-reflective layer. The high refractive layer is formed directly with the substrate and the low refractive layer, respectively. The "directly formed" means that there are no other layers between the layer and the layer.

The high refractive layer has a thickness of 0.05 μm to 20 μm, a refractive index of 1.45 to 2, and a haze value specified in JIS-K7361 is not different from the haze value of the base material or 10% or less of the difference between the haze value of substrate, which is excellent in transparency and is excellent in anti-reflective properties.

The hard coating layer increases a hardness of the anti-reflective layer so that even if the anti-reflective layer is used on the outermost surface of the display device, scratches may not be generated. The hard coating layer is not necessarily provided. The hard coating layer may be omitted if a target hardness is secured in the high or low refractive layer.

The hard coating layer may be formed between the substrate and the high refractive layer or between the substrate and the low refractive layer.

The hard coating layer may be a cured layer formed by uniformly mixing ultrafine metal oxide particles having an average particle diameter of 1 nm to 30 nm and a particle size distribution range of less than or equal to ±5 nm in a cured binder. The hard coating layer may have a thickness of 1 μm to 15 μm, and the refractive index of the hard coating layer may be greater than or equal to 1.54.

The anti-reflective layer may have a thickness of 50 μm to 500 μm, for example 50 μm to 300 μm, for example 50 μm to 150 μm. When the anti-reflective layer has a thickness within the above range, it may be easily applied to a display device.

The adhesive layer may be formed on the lower surface of the anti-reflective layer to adhere an optical member such as a display to a panel or the like. As described above, the adhesive layer may include a compound (dye) represented by Chemical Formula 1.

The adhesive layer may have a glass transition temperature of −70° C. to 0° C., for example −65° C. to −20° C. When the glass transition temperature of the adhesive layer is within the above range, adhesion to the panel may be improved.

The adhesive layer may be a thermosetting adhesive layer or a photocurable adhesive layer. Desirably, since the adhesive layer becomes a thermosetting adhesive layer, it is not necessary to consider the effect of ultraviolet rays due to the absorption wavelength of the compound (dye) represented by Chemical Formula 1, thereby facilitating the manufacture of the adhesive layer. The "thermosetting adhesive layer" may include not only an adhesive layer cured through a predetermined heat treatment at 40° C. to 100° C., but also an adhesive layer cured at room temperature (e.g., 20° C. to 30° C.).

The adhesive layer may be formed of a composition for an adhesive layer including an adhesive resin and a curing agent.

The type of the adhesive resin is not limited as long as it can secure the glass transition temperature of the adhesive layer. For example, the adhesive resin may be a silicone-based, urethane-based, (meth)acryl-based resin, or the like, but desirably, a (meth)acryl-based adhesive resin may be used.

The adhesive resin may have a glass transition temperature of −70° C. to 0° C., desirably −65° C. to −20° C. When the glass transition temperature of the adhesive resin has the above range, adhesion to the panel may be improved.

The adhesive resin may have a weight average molecular weight of 500,000 g/mol to 2,000,000 g/mol, for example 800,000 g/mol to 1,500,000 g/mol. When the weight average molecular weight of the adhesive resin has the above range, adhesion to the panel may be improved.

The adhesive resin may include a copolymer, desirably a random copolymer of at least one of a (meth)acryl-based monomer having an alkyl group; a (meth)acryl-based monomer having a hydroxyl group; and a (meth)acryl-based monomer having an aromatic group, a (meth)acryl-based monomer having an alicyclic group, and a (meth)acryl-based monomer having a heteroalicyclic group.

The (meth)acryl-based monomer having the alkyl group may include a (meth)acrylic acid ester having an unsubstituted C1 to C10 alkyl group. Specifically, the (meth)acryl-based monomer having the alkyl group may include one or more of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth) acrylate, octyl (meth)acrylate, iso-octyl (meth)acrylate, nonyl (meth)acrylate, and decyl (meth)acrylate, but is not limited thereto. These may be included alone or in combination of two or more. The (meth)acryl-based monomer having the alkyl group may be included in an amount of 60 wt % to 99.99 wt %, for example 60 wt % to 90 wt %, for example 80 wt % to 99.9 wt % of the monomer mixture.

The (meth)acryl-based monomer having the hydroxyl group may include one or more of a (meth)acryl-based monomer having a C1 to C20 alkyl group having at least one hydroxyl group, a (meth)acryl-based monomer having a C3 to C20 cycloalkyl group having at least one hydroxyl group, and a (meth)acryl-based monomer having a C6 to C20 aromatic group having at least one hydroxyl group. Specifically, the (meth)acryl-based monomer having the hydroxyl group may include desirably a (meth)acryl-based monomer having a C1 to C20 alkyl group having at least one hydroxyl group, one or more of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth) acrylate, 1-chloro-2-hydroxypropyl(meth)acrylate. These may be included alone or in combination of two or more. The (meth)acryl-based monomer having the hydroxyl group may be included in an amount of 0.01 wt % to 20 wt %, for example 0.1 wt % to 10 wt % of the monomer mixture.

The (meth)acryl-based monomer having the aromatic group may include a (meth)acrylic acid ester having a C6 to C20 aryl group or a C7 to C20 arylalkyl group. Specifically, the (meth)acryl-based monomer having the aromatic group may include, but is not limited to, phenyl (meth)acrylate, benzyl (meth)acrylate, and the like. The (meth)acryl-based monomer having the aromatic group may be included in an amount of 0 wt % to 50 wt %, for example 0 wt % to 20 wt % of the monomer mixture.

In the present specification, when an alicyclic group and an alkyl group are mixed among the monomers, it is classified as a (meth)acryl-based monomer having an alicyclic group. The (meth)acryl-based monomer having the alicyclic group may be a (meth)acrylic acid ester having a C5 to C20 monocyclic or heterocyclic alicyclic group and may include at least one of cyclohexyl(meth)acrylate, isobornyl(meth)acrylate, dicyclopentanyl(m eth)acrylate, methylcyclohexyl(meth)acrylate, and dicyclopentenyl (meth)acrylate. The (meth)acryl-based monomer having the alicyclic group may be included in an amount of 0 wt % to 50 wt %, for example 1 wt % to 30 wt %, or 1 wt % to 20 wt % of the monomer mixture.

The (meth)acryl-based monomer having the heteroalicyclic group may include a (meth)acrylic acid ester having a C4 to C9 heteroalicyclic group including at least one of nitrogen, oxygen, or sulfur. Specifically, the (meth)acryl-based monomer having the heteroalicyclic group may include (meth)acryloylmorpholine, but is not limited thereto. The (meth)acryl-based monomer having the heteroalicyclic group may be included in an amount of 0 wt % to 50 wt %, for example 0 wt % to 10 wt % of the monomer mixture.

The adhesive resin may include a (meth)acryl-based copolymer of a monomer mixture including 70 wt % to 99.99 wt %, for example 90 wt % to 99.5 wt % of the (meth)acryl-based monomer having the alkyl group, 0.01 wt % to 30 wt %, for example 0.5 wt % to 10 wt % of the (meth)acryl-based monomer having the hydroxyl group. When each of the monomers constituting the adhesive resin has the above ranges, adhesive strength may be easily secured.

The curing agent may include an isocyanate-based curing agent. The curing agent may be included in an amount of 0.01 parts by weight to 20 parts by weight, for example 0.01 parts by weight to 10 parts by weight, for example 0.1 parts by weight to 4 parts by weight, based on 100 parts by weight of the adhesive resin. When the curing agent has the above range, the composition may be crosslinked to form an adhesive layer and to prevent a decrease in transparency and poor reliability due to its excessive use.

The composition may further include conventional additives such as a silane coupling agent, an antioxidant, a tackifying resin, a plasticizer, an antistatic agent, a rework agent, and a curing catalyst. The silane coupling agent may be included in an amount of 0.01 parts by weight to 20 parts by weight, for example 0.01 parts by weight to 10 parts by weight, for example 0.1 parts by weight to 4 parts by weight, based on 100 parts by weight of the adhesive resin. When the silane coupling agent has the above range, adhesion may be controlled and reliability defects may be prevented.

The composition for the adhesive layer may be a solvent-free type or may further include a conventional organic solvent to increase coating properties.

The adhesive layer may have a thickness of 1 μm to 50 μm, for example, 5 μm to 25 μm. When the adhesive layer has a thickness within the above range, it may be easily used in a display device.

According to another embodiment, a display device including the anti-reflective film is provided. For example, a display device including the anti-reflective film and the quantum dot-containing layer may be provided.

For example, the display device may further include a light source, a color filter, and a substrate.

Figure 3:
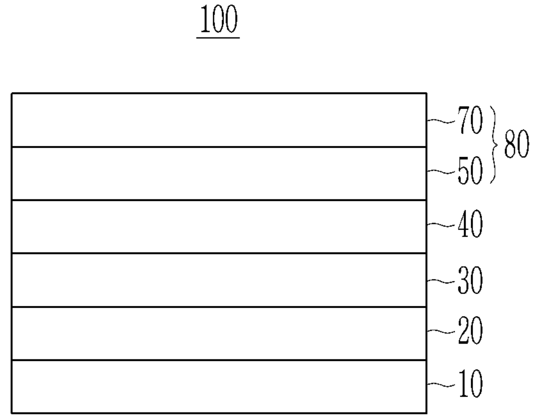
FIGS. 3 and 4 are schematic views each independently illustrating a display device according to an embodiment.
Figure 4:
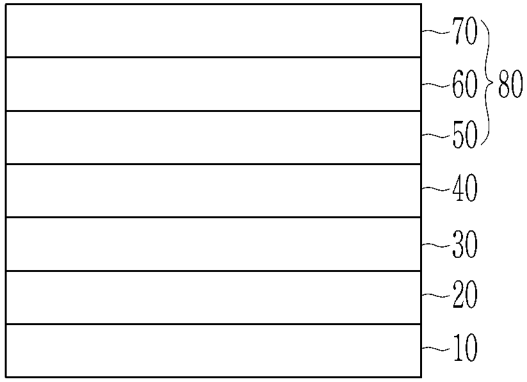
Figure 5:
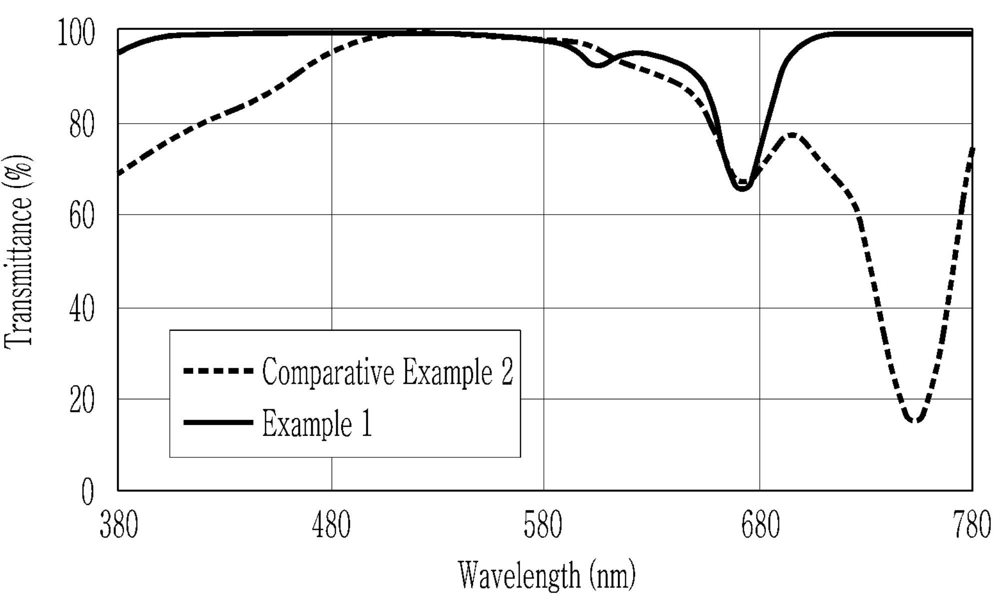
FIG. 5 is a graph showing the light transmittance according to the wavelength of the dyes according to Synthesis Example 1 and Comparative Example 2.

For example, the display device may have a stacked structure in which the quantum dot-containing layer may be disposed on the light source, the color filter may be disposed on the quantum dot-containing layer, the substrate may be disposed on the color filter, and the anti-reflective film may be disposed on the substrate. (See FIGS. 3 and 4)

For example, the light source may be a blue light source.

For example, the substrate may be a glass substrate.

Components constituting the quantum dot-containing layer may further include a binder resin, a reactive unsaturated compound, a photopolymerization initiator, a diffusion agent, and other additives, which will be described later, in addition to the quantum dot.

The quantum dot may have a maximum fluorescence emission wavelength (fluorescence $\lambda_{max}$) in 400 nm to 500 nm of a wavelength range of 350 nm to 550 nm.

The quantum dot may have a full width at half maximum (FWHM) in a range of 20 nm to 100 nm, for example, 20 nm to 50 nm. When the quantum dot has a full width at half maximum (FWHM) within the range, the quantum dot has high color purity and thus an effect on increasing color reproducibility when used as a color material in a color filter.

The quantum dot may be an organic material, an inorganic material, or a hybrid (mixture) of the organic material and the inorganic material.

The quantum dot may each independently include a core and a shell surrounding the core, and herein, the core and the shell may have a structure such as a core each independently including Group II-IV, Group III-V, and the like, a core/a shell, a core/a first shell/a second shell, an alloy, an alloy/a shell, and the like, but are not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but is not necessarily limited thereto. The shell surrounding the core may include at least one material selected from CdSe, ZnSe, ZnS, ZnTe, CdTe, PbS, TiO, SrSe, HgSe, and an alloy thereof but is not necessarily limited thereto.

In an embodiment, since an interest in an environment has been recently much increased over the whole world, and a regulation about a toxic material also has been fortified, a cadmium-free light emitting material (InP/ZnS) having little low quantum efficiency (quantum yield) but being environmentally-friendly instead of a light emitting material having a cadmium-based core is used but not necessarily limited thereto.

The quantum dot having a core/shell structure may have an entire size (an average particle diameter) including the shell of 1 nm to 15 nm, for example, 5 nm to 15 nm, but its structure is not particularly limited.

For example, the quantum dot may be a red quantum dot, a green quantum dot, or a combination thereof. For example, the quantum dot may include both green quantum dot and red quantum dot. In this case, the green quantum dots may be included in an amount greater than that of the red quantum dots. The red quantum dot may have an average particle diameter of 10 nm to 15 nm. The green quantum dot may have an average particle diameter of 5 nm to 8 nm.

Meanwhile, for the dispersion stability of the quantum dots, a dispersant may be used together. The dispersant may help a photoconversion material such as the quantum dot uniformly dispersed in the curable composition and include a non-ionic, anionic, or cationic dispersant. Specifically, the dispersant may include polyalkylene glycol or esters thereof, polyoxy alkylene, polyhydric alcohol ester alkylene oxide addition products, alcohol alkylene oxide addition products, sulfonate esters, sulfonate salts, carboxylate esters, carboxylate salts, alkyl amide alkylene oxide addition products, alkyl amines and may be used alone or as a mixture of two or more. The dispersant may be used in an amount of 0.1 wt % to 100 wt %, for example, 10 wt % to 20 wt % based on the solid content of the photoconversion material such as the quantum dots.

The quantum dots may be included in an amount of 1 to 40 parts by weight, for example, 1 to 10 parts by weight, based on 100 parts by weight of the components constituting the quantum dot-containing layer. When the quantum dot is included within the above range, the light conversion rate is improved and the pattern characteristics and development characteristics are not impaired, so that excellent processability may be obtained.

The binder resin may include an acryl-based resin, an epoxy resin, or a combination thereof.

The acryl-based resin is a copolymer of a first ethylenic unsaturated monomer and a second ethylenic unsaturated monomer that is copolymerizable therewith, and is a resin including at least one acryl-based repeating unit.

The first ethylenic unsaturated monomer is an ethylenic unsaturated monomer including at least one carboxyl group. Examples of the monomer include acrylic acid, methacrylic acid, maleic acid, itaconic acid, fumaric acid, or a combination thereof.

The first ethylenic unsaturated monomer may be included in an amount of 5 wt % to 50 wt %, for example, 10 wt % to 40 wt % based on the total amount of the acryl-based binder resin.

The second ethylenic unsaturated monomer may be an aromatic vinyl compound such as styrene, α-methylstyrene, vinyl toluene, vinylbenzylmethylether, and the like; an unsaturated carboxylate ester compound such as methyl (meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; an unsaturated carboxylic acid amino alkyl ester compound such as 2-aminoethyl (meth)acrylate, 2-dimethylaminoethyl(meth)acrylate, and the like; a carboxylic acid vinyl ester compound such as vinyl acetate, vinyl benzoate, and the like; a unsaturated carboxylic acid glycidyl ester compound such as glycidyl (meth)acrylate, and the like; a vinyl cyanide compound such as (meth)acrylonitrile, and the like; a unsaturated amide compound such as (meth)acrylamide, and the like; and the like and may be used alone or as a mixture of two or more.

Specific examples of the acryl-based resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and the like, but are not limited thereto and may be used alone or as a mixture of two or more.

The acryl-based resin may have a weight average molecular weight of 1,000 g/mol to 15,000 g/mol. When the acryl-based resin has a weight average molecular weight within the range, close-contacting properties to a substrate, and physical and chemical properties are improved and viscosity is appropriate.

The epoxy resin may be a thermally polymerizable monomer or oligomer, and may include a compound having a carbon-carbon unsaturated bond and a carbon-carbon cyclic bond.

The epoxy resin may further include a bisphenol A epoxy resin, a bisphenol F epoxy resin, a phenol novolac epoxy resin, a cyclic aliphatic epoxy resin, and an aliphatic polyglycidyl ether, but is not necessarily limited thereto.

Commercially available products of the compounds may be YX4000, YX4000H, YL6121H, YL6640, or YL6677 of Yuka Shell Epoxy Co., Ltd.; EOCN-102, EOCN-1035, EOCN-104S, EOCN-1020, EOCN-1025, or EOCN-1027 of Nippon Kayaku Co. Ltd. and EPIKOTE 180S75 of Yuka Shell Epoxy Co., Ltd.; a bisphenol A epoxy resin such as EPIKOTE 1001, 1002, 1003, 1004, 1007, 1009, 1010 and 828 of Yuka Shell Epoxy Co., Ltd.; a bisphenol F epoxy resin such as EPIKOTE 807 and 834 of Yuka Shell Epoxy Co., Ltd.; a phenol novolac epoxy resin such as EPIKOTE 152, 154, or 157H65 of Yuka Shell Epoxy Co., Ltd. and EPPN 201, 202 of Nippon Kayaku Co. Ltd.; a cyclic aliphatic epoxy resin such as CY175, CY177, and CY179 of CIBA-GEIGY A.G Corp., ERL-4234, ERL-4299, ERL-4221 and ERL-4206 of U.C.C., Showdyne 509 of Showa Denko K.K., Araldite CY-182 of CIBA-GEIGY A.G Corp., CY-192 and CY-184, Dainippon Ink & Chemicals Inc., EPICLON 200 and 400, EPIKOTE 871, 872 of Yuka Shell Epoxy Co. and EP1032H60, ED-5661, and ED-5662 of Celanese Coating Corporation; an aliphatic polyglycidylether may be EPIKOTE 190P and 191P of Yuka Shell Epoxy Co., EPOLITE 100MF of Kyoeisha Yushi Kagaku Kogyo Co., Ltd., EPIOL TMP of Nihon Yushi K. K., and the like.

The binder resin may be included in an amount of 1 to 40 parts by weight, for example, 5 to 20 parts by weight, based on 100 parts by weight of the components constituting the quantum dot-containing layer. When the binder resin is included within the above range, excellent sensitivity, developability, resolution, and linearity of the pattern may be obtained.

The reactive unsaturated compound may be used by mixing monomers or oligomers generally used in conventional photocurable compositions and thermosetting compositions.

The reactive unsaturated compound may be an acrylate-based compound. For example, at least one of ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate, or a mixture thereof may be used.

The reactive unsaturated compound may be treated with acid anhydride to improve developability.

The reactive unsaturated compound may be included in an amount of 1 to 10 parts by weight, for example, 1 to 5 parts by weight, based on 100 parts by weight of the component constituting the quantum dot-containing layer. When the reactive unsaturated compound is included within the above range, curing occurs sufficiently during exposure in the pattern formation process, resulting in excellent reliability, heat resistance, light resistance, chemical resistance, resolution, and close-contacting properties of the pattern.

The photopolymerization initiator may be a acetophenone-based compound, a benzophenone-based compound, a thioxanthone-based compound, a benzoin-based compound, an oxime-based compound, and the like.

Examples of the acetophenone-based compound may be 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylamino-benzophenone, 4,4'-di chlorobenzophenone, 3,3 '-dimethyl methoxybenzophenone, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphtho-1-yl)-4,6-bis(trichloromethyl)-s-triazine,2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime-based compound may be O-acyloxime-based compound, 2-(O-benzoyloxime)-1-[4-(phenylthio)phenyl]-1,2-octanedione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like. Specific examples of the O-acyloxime-based compound may be 1,2-octanedione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and the like.

The photopolymerization initiator may further include a carbazole-based compound, a diketone-based compound, a sulfonium borate-based compound, a diazo-based compound, an imidazole-based compound, a biimidazole-based compound, a fluorene-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

The photopolymerization initiator may be included in an amount of 0.1 parts by weight to 10 parts by weight, for example, 0.1 parts by weight to 5 parts by weight, based on 100 parts by weight of the components constituting the quantum dot-containing layer. When the photopolymerization initiator is included within the above range, a balance between sensitivity and developability during exposure is improved, so that a pattern having excellent resolution without residual film may be obtained.

The quantum dot-containing layer may further include a diffusion agent.

For example, the diffusion agent may include barium sulfate ($BaSO_4$), calcium carbonate ($CaCO_3$), titanium dioxide ($TiO_2$), zirconia ($ZrO_2$), or a combination thereof.

The diffusion agent reflects light not absorbed in the aforementioned quantum dot, so that the reflected light may be adsorbed again in the quantum dot. In other words, the diffusion agent increases an amount of the light absorbed in the quantum dot and thus light conversion efficiency of the curable composition.

The diffusion agent may have an average particle diameter ($D_{50}$) within a range of 150 nm to 250 nm and specifically, 180 nm to 230 nm. When the diffusion agent has an average particle diameter within the range, much more excellent light scattering effects may be obtained, and light conversion efficiency may be increased.

The diffusion agent may be included in an amount of 0.1 wt % to 20 wt %, for example 0.1 wt % to 5 wt %, based on a solid content of 100 parts by weight of components constituting the quantum dot-containing layer. When the diffusion agent is included in an amount of less than 0.1 wt % based on 100 parts by weight of components constituting the quantum dot-containing layer, it is difficult to expect the effect of improving the light conversion efficiency by using the diffusion agent, while when the diffusion agent is included in an amount of greater than 5 wt %, pattern characteristics of may be deteriorated.

In order to improve the stability and dispersibility of the quantum dots, the quantum dot-containing layer may further include a thiol-based additive.

The thiol-based additive may replace the shell surface of the quantum dot, and may improve dispersion stability of a quantum dot in a solvent and may stabilize the quantum dot.

The thiol-based additive may have one or more, for example, 2 to 10, for example 2 to 4 thiol groups (—SH) at the terminal end according to its structure.

For example, the thiol-based additive may include at least two functional groups represented by Chemical Formula 15.

[Chemical Formula 15]

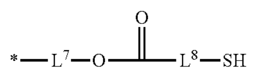

In Chemical Formula 15, $L^7$ and $L^8$ are each independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

For example, the thiol-based additive may be represented by Chemical Formula 16.

[Chemical Formula 16]

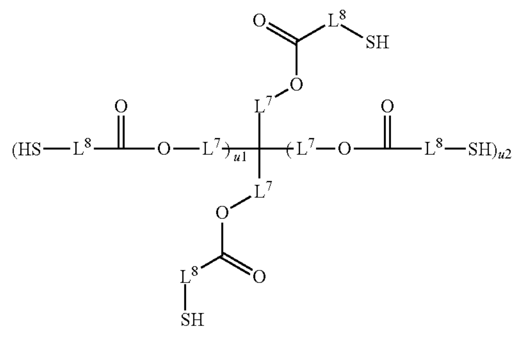

In Chemical Formula 16, $L^7$ and $L^8$ are each independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group, and u1 and u2 are each independently an integer of 0 or 1.

For example, in Chemical Formula 15 and Chemical Formula 16, $L^7$ and $L^8$ may each independently be a single bond or a substituted or unsubstituted C1 to C20 alkylene group. Specific examples of the thiol-based additive may be selected from pentaerythritol tetrakis(3-mercaptopropionate) represented by Chemical Formula 16a, trimethylolpropane tris(3-mercaptopropionate) represented by Chemical Formula 16b, pentaerythritol tetrakis(mercaptoacetate) represented by Chemical Formula 16c, trimethylolpropane tris(2-mercaptoacetate) represented by Chemical Formula 16d, glycol di-3-mercaptopropionate represented by Chemical Formula 16e, and a combination thereof.

[Chemical Formula 16a]

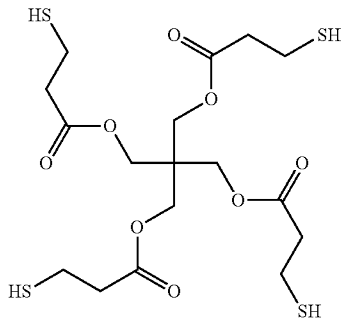

[Chemical Formula 16b]

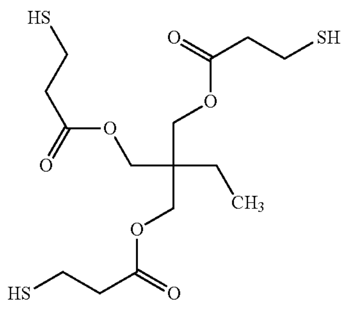

[Chemical Formula 16c]

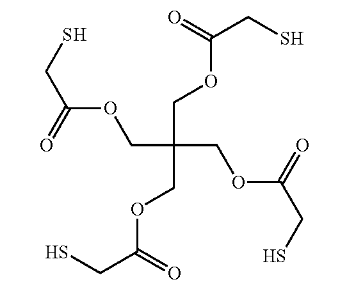

[Chemical Formula 16d]

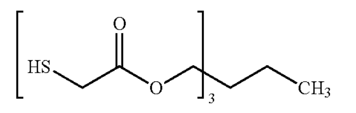

[Chemical Formula 16e]

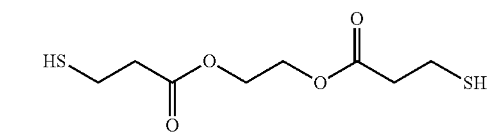

The thiol-based additive may be included in an amount of 0.1 parts by weight to 10 parts by weight, for example 0.1 parts by weight to 5 parts by weight based on 100 parts by weight of components constituting the quantum dot-containing layer. When the thiol-based additive is included within the ranges, stability of a photoconversion material such as a quantum dot may be improved, the thiol group in the component reacts with an acrylic group of a resin or a monomer to form a covalent bond and thereby heat resistance of a photoconversion material such as a quantum dot may be improved.

The quantum dot-containing layer may further include a polymerization inhibitor including a hydroquinone-based compound, a catechol-based compound, or a combination thereof. As the quantum dot-containing layer further includes the hydroquinone-based compound, catechol-based compound, or combination thereof, after printing (coating) a composition including quantum dots, crosslinking at room temperature may be prevented during exposure.

For example, the hydroquinone-based compound, catechol-based compound, or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O,O') aluminium, or a combination thereof, but is not necessarily limited thereto.

The hydroquinone-based compound, catechol-based compound, or combination thereof may be used in the form of a dispersion, and the polymerization inhibitor in the dispersion form may be included in an amount of 0.001 parts by weight to 1 part by weight, for example 0.01 parts by weight to 0.1 parts by weight, based on 100 weight of components constituting a layer including a quantum dot and a fluorescent dye or a quantum dot-containing layer (including no fluorescent dye). When the stabilizer is included within the above range, the problem with aging at room temperature may be solved and sensitivity reduction and surface peeling may be prevented.

The quantum dot-containing layer may further include malonic acid; 3-amino-1,2-propanediol; a silane-based coupling agent; a leveling agent; a fluorine-based surfactant; or combination thereof in addition to the thiol-based additive and polymerization inhibitor.

In addition, the quantum dot-containing layer may further include a silane coupling agent having a reactive substituent such as a carboxyl group, a methacryloyl group, an isocyanate group, an epoxy group, and the like to improve its close-contacting properties to a substrate.

Examples of the silane-based coupling agent may include trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, β-epoxycyclohexyl)ethyltrimethoxysilane, and the like and these may be used alone or in a mixture of two or more.

The silane-coupling agent may be included in an amount of 0.01 parts by weight to 10 parts by weight based on 100 parts by weight of components constituting the quantum dot-containing layer. When the silane-coupling agent is included within the range, close contacting property, storing property, and the like may be improved.

In addition, the quantum dot-containing layer may further include a surfactant, for example a fluorine-based surfactant to improve coating and prevent a defect if necessary.

Examples of the fluorine-based surfactant may be BM-1000® and BM-1100® of BM Chemie Inc.; MEGAFACE F 142D®, F 172®, F 173, and F 183 of Dainippon Ink Kagaku Kogyo Co., Ltd.; FULORAD FC-135®, FULORAD FC-170C®, FULORAD FC-430°, and FULORAD FC-431 of Sumitomo 3M Co., Ltd.; SURFLON 5-112®, SURFLON 5-113®, SURFLON S-131®, SURFLON S-141®, and SURFLON S-145® of ASAHI Glass Co., Ltd.; and SH-28PA®, SH-190®, SH-193®, SZ-6032®, and SF-8428®, and the like of Toray Silicone Co., Ltd.; F-482, F-484, F-478, F-554 and the like of DIC Co., Ltd.

The fluorine-based surfactant may be included in an amount of 0.001 parts by weight to 5 parts by weight based on 100 parts by weight of components constituting the quantum dot-containing layer. When the fluorine-based surfactant is included within the range, excellent wetting on a glass substrate as well as coating uniformity may be secured, but a stain may not be produced.

In addition, a certain amount of other additives such as antioxidants and stabilizers may be further added to the quantum dot-containing layer within a range that does not impair physical properties.

A method of manufacturing each of the quantum dot-containing layers may include coating a curable composition including the above-described components and the like on a substrate by an ink jet spraying method (S1) to form a pattern; and curing the pattern (S2).

(S1) Formation of Pattern

The curable composition is coated on a substrate in a thickness of 0.5 to 10 μm in an ink jet dispersion method. According to the inkjet dispersion, a pattern may be formed by repetitively dispersing desired colors one by one or simultaneously dispersing the desired colors to simplify the process.

(S2) Curing

A cured resin film can be obtained by curing the obtained pattern. At this time, a thermal curing process is preferable as a method of curing. The thermal curing process may be a process of first removing the solvent in the curable composition by heating at a temperature of greater than or equal to about 100° C. for about 3 minutes, and then curing by heating at a temperature of 160° C. to 300° C., and more desirably heating at a temperature of 180° C. to 250° C. for about 30 minutes.

In addition, each of the quantum dot-containing layers may be manufactured without ink jetting. The manufacturing method in this case includes, coating the curable composition including the aforementioned components, for example, at a thickness of 0.5 μm to 10 μm using a suitable method such as spin coating, roller coating, spray coating, etc. on a substrate subjected to a predetermined pretreatment, and irradiating the resultant with light to form a pattern required for the color filter. As a light source used for irradiation, UV, electron beam, or X-ray may be used, and for example, UV in a region of 190 nm to 450 nm, specifically 200 nm to 400 nm may be irradiated. In the irradiation process, a photoresist mask may be further used. After performing the irradiation process in this way, the composition layer irradiated with the light source is treated with a developing solution. At this time, the unexposed portion of the composition layer is dissolved to form a pattern necessary for the color filter. By repeating this process according to the number of required colors, a color filter having a desired pattern may be obtained. In addition, when an image pattern obtained by development in the above process is heated again or cured by irradiation with actinic rays, crack resistance and solvent resistance may be improved.

The curable composition may further include a solvent.

The solvent may include compounds of alcohols such as methanol, ethanol, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol monomethylether acetate, propylene glycol propylether acetate, and the like; ketones such as methylethylketone, cyclohexanone, 4 -hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; or ketone acid esters such as ethyl pyruvate, and the like. In addition, N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γbutyrolactone, ethylene carbonate, propylene carbonate, phenyl cellosolve acetate, dimethyladipate may also be used, but is not limited thereto.

For example, the solvent may be desirably glycol ethers such as ethylene glycol monoethylether, ethylenediglycolmethylethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol monomethylether acetate, propylene glycol propylether acetate, and the like; alcohols such as ethanol, and the like, or a combination thereof.

For example, the solvent may include propylene glycol monomethylether acetate, dipropylene glycol methylether acetate, ethanol, ethylene glycoldimethylether, ethylenediglycolmethylethylether, diethylene glycoldimethylether, dimethyl acetamide, 2-butoxyethanol, N-methylpyrrolidine, N-ethylpyrrolidine, propylene carbonate, γ-butyrolactone, dimethyladipate, or a combination thereof.

The solvent may be included in a balance amount based on a total amount of the curable composition.

Hereinafter, examples of the present invention are described. These examples, however, are not in any sense to be interpreted as limiting the scope of the invention.

(Synthesis of Compounds)

Synthesis Example 1: Synthesis of Compound Represented by Chemical Formula 10

(1) In a 500 ml round-bottomed flask, 35 g of chlorosulfonic acid was put and then, stirred at less than 30° C. 5 g of CuPC (copper(II) phthalocyanine) was slowly added thereto at less than or equal to 50° C. and then, stirred at 90° C. for 3 hours. The reactant was cooled again to less than 30° C., and thionyl chloride (4 g) was slowly added thereto in a dropwise fashion at less than 30° C. When the addition was completed, the reactant was stirred at 95° C. for 1 hour. Subsequently, the reactant was cooled to room temperature and neutralized by using 300 mL of water at less than or equal to 10° C. Then, a solid therefrom was several times washed with water.

(2) The filtered solid was put in a flask, and 100 mL of water was added thereto and then, stirred and cooled to 10° C. Subsequently, cyclohexylamine (3.4 g) was slowly added thereto in a dropwise fashion and then, stirred for 1 hour. After increasing the reaction temperature to 65° C., the mixture was reacted for 6 hours. The reactant was filtered and washed, and a solid produced therein was dried, obtaining 53 g of a compound represented by Chemical Formula 10.

[Chemical Formula 10]

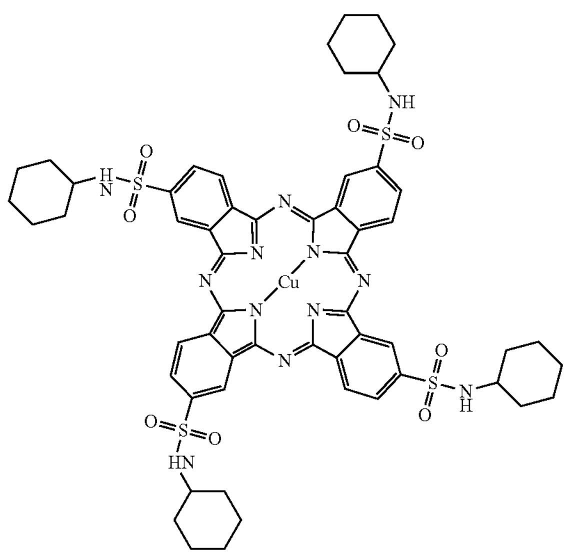

$[M+H]^+$ (1222), λmax=(673) nm

Synthesis Example 2: Synthesis of Compound Represented by Chemical Formula 17

A compound represented by Chemical Formula 17 was synthesized in the same manner as in Synthesis Example 1 except that cyclopentylamine was used in the cyclohexylamine.

[Chemical Formula 17]

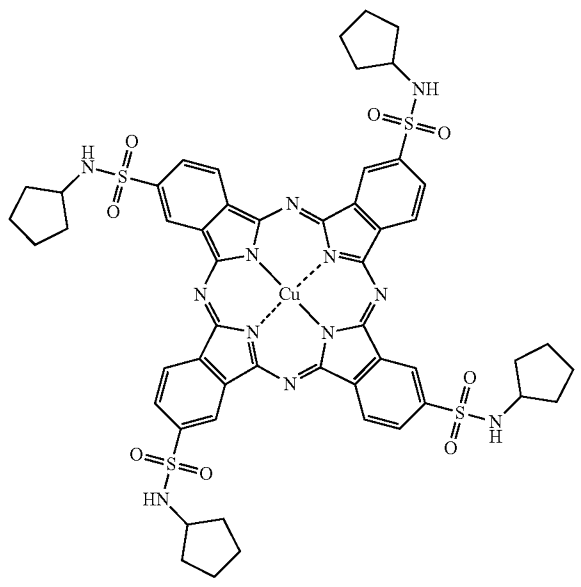

$[M+H]^+$ (1165), λmax=(673) nm

Comparative Synthesis Example 1: Synthesis of Compound Represented by Chemical Formula 18

4-(2-phenylphenoxy)phthalonitrile (4 g), diazabicycloundec-7-ene (2.5 g), and 40 mL of 1-pentenol were put in a 250 mL flask and then, heated to dissolve the solids, and copper acetate (1.8 g) was added thereto and then, refluxed, while heated. When a reaction was completed, after removing the solvent, the residue was purified through column chromatography. The obtained solid was dissolved in an appropriate amount of dichloromethane thereto and then, crystallized in methanol. The obtained solid was filtered and vacuum-dried, synthesizing a compound represented by Chemical Formula 18.

[Chemical Formula 18]

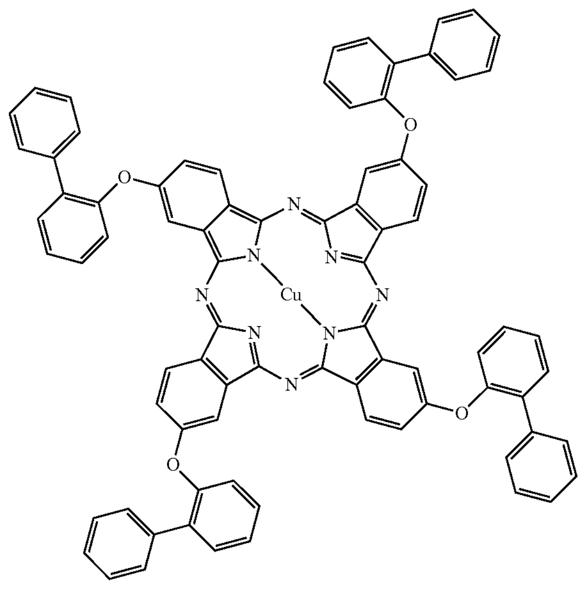

$[M+H]^+$ (1249), λmax=(673) nm

Comparative Synthesis Example 2: Synthesis of Compound Represented by Chemical Formula 19

A compound represented by Chemical Formula 19 was synthesized in the same manner as in Synthesis Example 1 except that 2-ethylhexylamine was used instead of the cyclohexylamine.

[Chemical Formula 19]

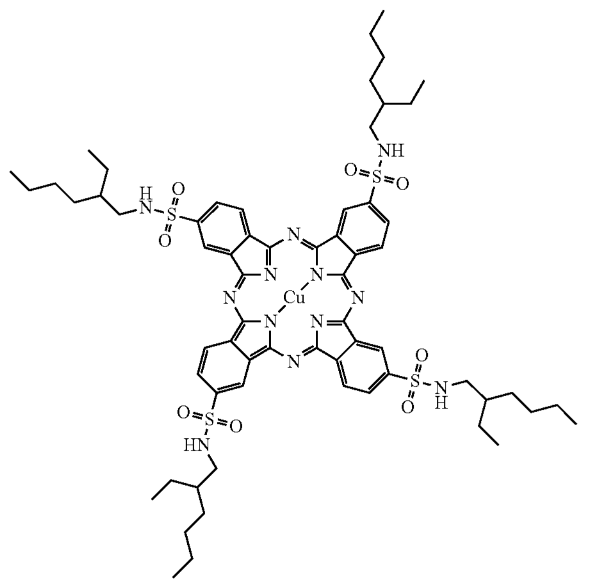

$[M+H]^+$ (1342), λmax=(672) nm

Comparative Synthesis Example 3: Synthesis of Compound Represented by Chemical Formula 20

A compound represented by Chemical Formula 20 was synthesized in the same manner as in Synthesis Example 1 except that methyl leucinate was used instead of the cyclohexylamine.

[Chemical Formula 20]

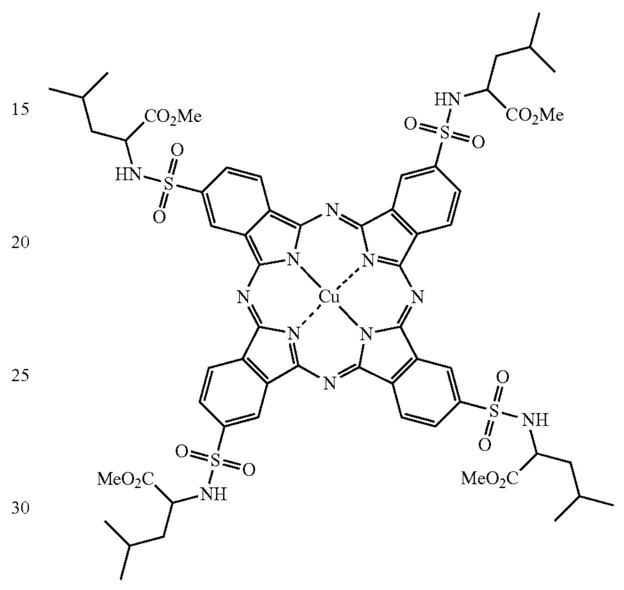

$[M+H]^+$ (1406), λmax=(671) nm

Preparation Example: Preparation of Copolymer of Composition for Adhesive Layer 100 parts by weight of a monomer mixture including 99 parts by weight of n-butylacrylate and 1 part by weight of 2-hydroxyethylacrylate and 150 parts by weight of ethylacetate were put into a 1 L reactor equipped with a condenser to conveniently control a temperature, in which nitrogen gas was refluxed, and while the flask was stirred, nitrogen gas was injected thereinto for 1 hour to substitute nitrogen for oxygen in the reactor, and then, the reactor was maintained at 70° C. 0.06 parts by weight of 2,2'-azobisisobutyronitrile as an initiator was added thereto and then, reacted for 8 hours to prepare a solution containing a (meth)acryl-based copolymer. The (meth)acryl-based copolymer had Tg of −46° C. and a weight average molecular weight of 1,100,000 g/mol. Ethyl acetate was added thereto, preparing 19.4 wt % of a (meth)acryl-based copolymer solution.

Example 1

The composition for a thermosetting coating layer was directly coated on the bottom surface of a PET film, which was a base film of an anti-reflective film (the anti-reflective film in which a hard coating layer, a high refractive layer, and a low refractive layer were sequentially laminated on the top surface of the PET film as a base film, Reflectance: 0.2%, DNP, LLC.) with a bar coater and then, dried in a 90° C. oven for 4 minutes, manufacturing a sheet for an optical member including a 20 μm-thick thermosetting coating layer.

Based on 100 parts by weight of the (meth)acryl-based copolymer prepared in the preparation example, 0.193 parts by weight of an XDI-based isocyanate-based crosslinking agent (Solid: 75%, TD-75, Soken Chemical & Engineering Co., Ltd.) and 0.154 parts by weight of 3-glycidoxypropyl trimethoxysilane (KBM-403, ShinEtsu Chemical Co., Ltd.) as a silane coupling agent were mixed. As a selective wavelength absorption dye, 0.06 parts by weight of the compound of Synthesis Example 1 (represented by Chemical Formula 10) and 25 parts by weight of methylethylketone were added thereto, preparing a composition for an adhesive layer. The composition for an adhesive layer was applied to a PET release film and dried in a 90° C. oven for 4 minutes, manufacturing a 20 μm-thick adhesive sheet.

The obtained adhesive sheet was laminated on the bottom surface of the PET film, which was a base film of an anti-reflective film (the anti-reflective film in which a hard coating layer, a high refractive layer, and a low refractive layer were sequentially laminated on the top surface of the PET film as a base film, Reflectance: 0.2%, DNP, LLC.), manufacturing an optical member of Example 1 in which the release film, the adhesive layer, and the anti-reflective film were sequentially laminated.

Example 2

An optical member was manufactured in the same manner as in Example 1 except that the compound (represented by Chemical Formula 17) of Synthesis Example 2 was used instead of the compound (represented by Chemical Formula 10) of Synthesis Example 1.

Comparative Example 1

An optical member was manufactured in the same manner as in Example 1 except that the compound (represented by Chemical Formula 18) of Comparative Synthesis Example 1 was used instead of the compound (represented by Chemical Formula 10) of Synthesis Example 1.

Comparative Example 2

An optical member was manufactured in the same manner as in Example 1 except that phthalocyanine-based dye (Maximum absorption wavelength: 752 nm, IN-88, Ukseung Chemical Co., Ltd.) was used instead of the compound (represented by Chemical Formula 10) of Synthesis Example 1.

Comparative Example 3

An optical member was manufactured in the same manner as in Example 1 except that the compound (represented by Chemical Formula 19) of Comparative Synthesis Example 2 was used instead of the compound (represented by Chemical Formula 10) of Synthesis Example 1.

Comparative Example 4

An optical member was manufactured in the same manner as in Example 1 except that the compound (represented by Chemical Formula 20) of Comparative Synthesis Example 3 was used instead of the compound (represented by Chemical Formula 10) of Synthesis Example 1.

Evaluation 1: Transmittance

The transmittances of the optical members according to Example 1 and Comparative Example 2 were measured at each wavelength using a UV-vis spectrophotometer, and the results are shown in Table 1.

TABLE 1

| | Transmittance for each wavelength | | |
|---|---|---|---|
| | @460 nm (Blue) | @630 nm (Red) | @673 nm |
| Example 1 | 99.8% | 94.9% | 67.0% |
| Comparative Example 2 | 86.5% | 91.5% | 67.1% |

Referring to Table 1, the optical member of Example 1 and the optical member of Comparative Example 2 equally absorbed light in a region of 673 nm and exhibited almost the same transmittance in a region of 460 nm and 630 nm, but the optical member of Example 1 exhibited higher transmittance than that of Comparative Example 2 and thus improved luminescence characteristics in the corresponding region.

Evaluation 2: Light Resistance Reliability

In order to check whether or not light resistance reliability was evaluated, the optical members according to Examples 1 and 2 and Comparative Examples 1 to 4 were measured with respect to light transmittance at a maximum absorption wavelength of each compound under the conditions [Light source lamp: Xenon lamp, Irradiation intensity: 0.35 W/cm$^2$, Irradiation temperature: 63° C., Irradiation time: 500 hours, Irradiation direction: from a side of the anti-reflective film] in Xenon Test Chamber (Q-SUN), and a change of the light transmittance was used to evaluate the light resistance reliability, and the results are shown in Table 2.

TABLE 2

| | Light resistance reliability (ΔT %) |
|---|---|
| Example 1 | 0.1 |
| Example 2 | 0.1 |
| Comparative Example 1 | 12.1 |
| Comparative Example 2 | 94.2 |
| Comparative Example 3 | 1.3 |
| Comparative Example 4 | 5.4 |

Referring to Table 2, as in Examples 1 and 2, the anti-reflective films including a dye having a cyclic substituent exhibited excellent light resistance reliability, compared with the anti-reflective films included in Comparative Examples 1 to 4.

In particular, the anti-reflective film including a dye with a zinc phthalocyanine structure according to Comparative Example 2 exhibited very weak light resistance reliability.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTION OF SYMBOLS

10 blue light source
20 quantum dot-containing layer
30 color filter
40 substrate
50 adhesive layer
60 dye-containing layer
70 anti-reflective layer
80 anti-reflective film
100 display device

The invention claimed is:

1. An anti-reflective film including a compound represented by Chemical Formula 1:

[Chemical Formula 1]

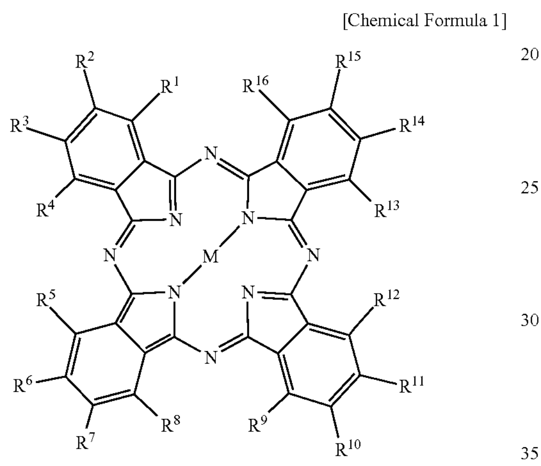

wherein, in Chemical Formula 1,

M is two hydrogen atoms, a divalent metal atom, a trivalent substituted metal atom, a tetravalent substituted metal atom, a metal hydroxide group, or a metal oxide group, and does not include Co, $R^1$ to $R^{16}$ are each independently hydrogen, a substituted or unsubstituted C1 to C20 alkyl group, a substituted or unsubstituted C3 to C20 cycloalkyl group, a substituted or unsubstituted C6 to C20 aryl group, a substituted or unsubstituted C2 to C20 heteroaryl group, a sulfonylamide group represented by Chemical Formula 2, or a combination thereof, at least one of $R^1$ to $R^8$ is a sulfonylamide group represented by Chemical Formula 2, at least one of $R^9$ to $R^{16}$ is a sulfonylamide group represented by Chemical Formula 2, and at most three of R1 to R16 are sulfonylamide groups represented by Chemical Formula 2;

[Chemical Formula 2]

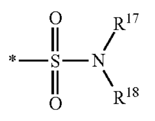

wherein, in Chemical Formula 2, $R^{17}$ and $R^{18}$ are each independently hydrogen, a substituted or unsubstituted C1 to C20 alkyl group, a substituted or unsubstituted C3 to C20 cycloalkyl group, a substituted or unsubstituted C6 to C20 aryl group, or a substituted or unsubstituted C2 to C20 heteroaryl group, at least one of $R^{17}$ and $R^{18}$ is a substituted or unsubstituted C3 to C20 cycloalkyl group, and

* indicates a bonding location to a benzene ring of Chemical Formula 1.

2. The anti-reflective film of claim 1, wherein:

$R^{17}$ and $R^{18}$ are each independently hydrogen or a substituted or unsubstituted C3 to C20 cycloalkyl group, and at least one of $R^{17}$ and $R^{18}$ is a substituted or unsubstituted C3 to C20 cycloalkyl group.

3. The anti-reflective film of claim 1, wherein Mis Cu, Zn, V(=O), or Ag.

4. The anti-reflective film of claim 1, wherein:

at least one of $R^1$ to $R^4$ is a sulfonylamide group represented by Chemical Formula 2, at least one of $R^5$ to $R^8$ is a sulfonylamide group represented by Chemical Formula 2, and at least one of $R^0$ to $R^{12}$ is a sulfonylamide group represented by Chemical Formula 2.

5. The anti-reflective film of claim 1, wherein:

at least one of $R^1$ to $R^4$ is a sulfonylamide group represented by Chemical Formula 2 and remaining ones of $R^1$ to $R^4$ are each a hydrogen atom, at least one of $R^5$ to $R^8$ is a sulfonylamide group represented by Chemical Formula 2 and remaining ones of $R^5$ to $R^8$ are each a hydrogen atom, and at least one of $R^9$ to $R^{12}$ is a sulfonylamide group represented by Chemical Formula 2 and remaining ones of $R^9$ to $R^{12}$ are each a hydrogen atom.

6. The anti-reflective film of claim 1, wherein:

the compound is represented by Chemical Formula 3:

[Chemical Formula 3]

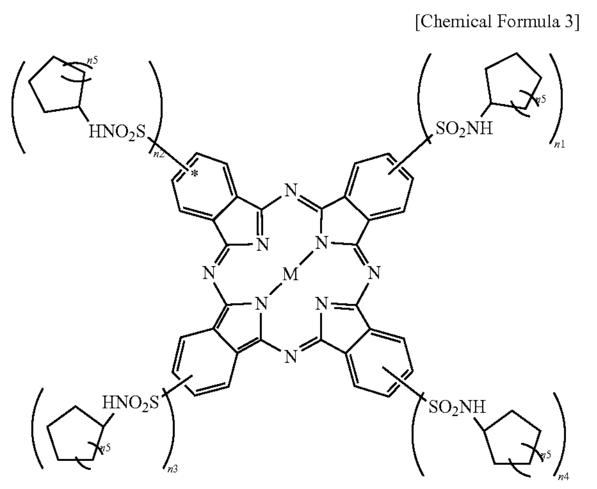

in Chemical Formula 3,

M is Cu, Zn, V(=O), or Ag, $n_1$ to $n_4$ are each independently 0 or 1, provided that at least one of $n_1$ and $n_4$ is 1 and that at least one of $n_2$ and $n_3$ is 1, and $n_5$ is an integer of 1 to 4, provided that $n_1+n_2+n_3+n_4 \neq \mathbf{0}$.

7. The anti-reflective film of claim 1, wherein the compound is represented by one Chemical Formula 4 to Chemical Formula 14:

[Chemical Formula 4]

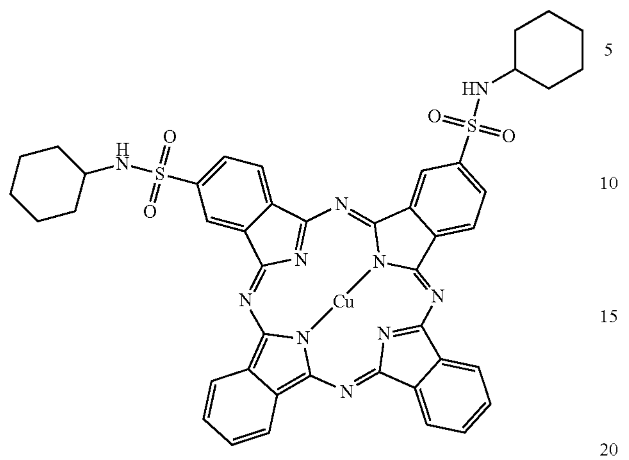

[Chemical Formula 5]

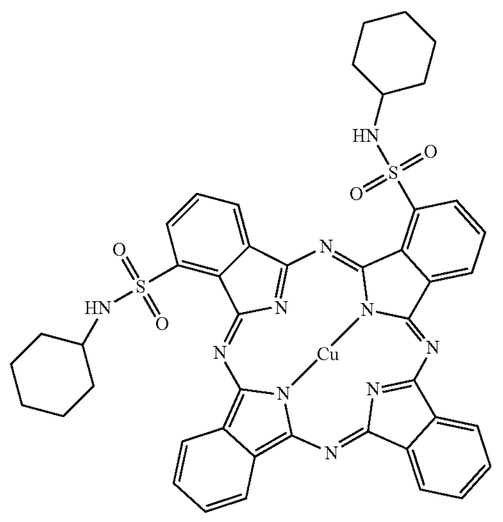

[Chemical Formula 6]

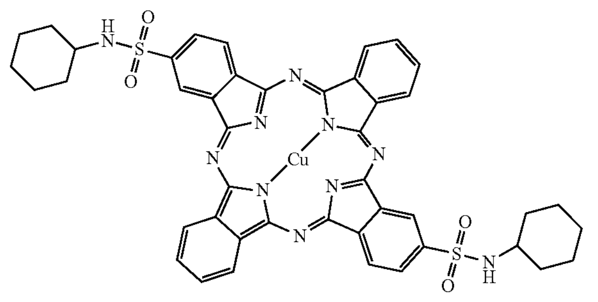

[Chemical Formula 7]

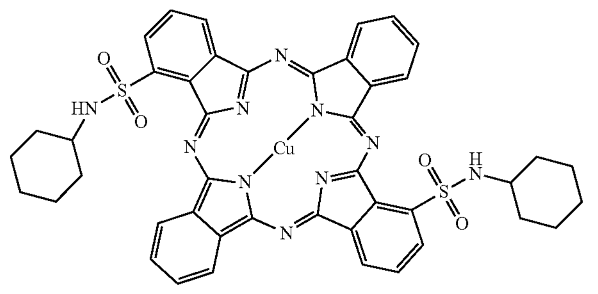

-continued

[Chemical Formula 8]

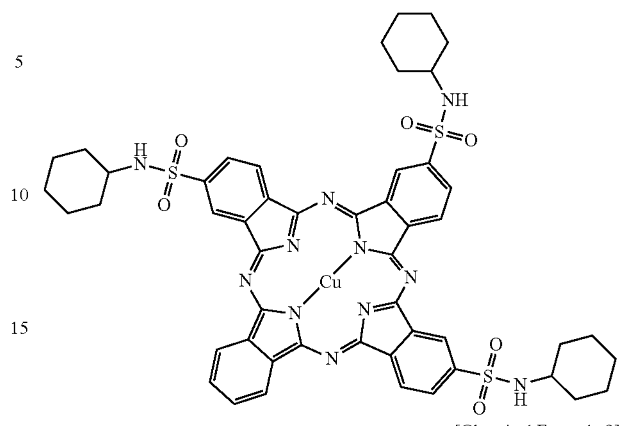

[Chemical Formula 9]

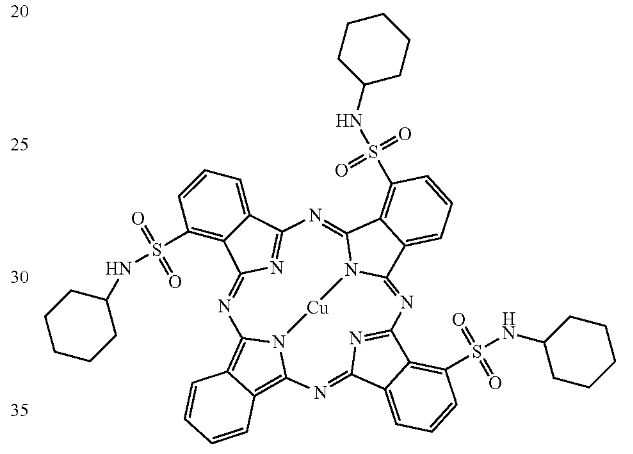

8. The anti-reflective film of claim 1, wherein the compound is a red absorbing dye.

9. The anti-reflective film of claim 8, wherein the dye has a maximum absorption peak at a wavelength of 650 nm to 750 nm.

10. The anti-reflective film of claim 1, wherein:

the anti-reflective film includes an adhesive layer and an anti-reflective layer on the adhesive layer, and the compound is included in the adhesive layer.

11. The anti-reflective film of claim 1, wherein:

the anti-reflective film includes an adhesive layer, a dye-containing layer, and an anti- reflective layer on the dye-containing layer, and the compound is included in the dye-containing layer.

12. A display device comprising the anti-reflective film of claim 1.

13. The display device of claim 12, further comprising a quantum dot-containing layer.

14. The display device of claim 13, further comprising a light source, a color filter, and a substrate.

15. The display device of claim 14, wherein, in the display device, the quantum dot-containing layer is disposed on the light source, the color filter is disposed on the quantum dot-containing layer, the substrate is disposed on the color filter, and the anti-reflective film is disposed on the substrate.

16. The display device of claim 14, wherein the substrate includes a glass substrate.

17. The anti-reflective film of claim 1, wherein the at least one of $R^{17}$ and $R^{18}$ is a substituted or unsubstituted C7 to C20 cycloalkyl group.

* * * * *